(12) United States Patent
Nakatsuka et al.

(10) Patent No.: US 12,321,233 B2
(45) Date of Patent: Jun. 3, 2025

(54) INFORMATION PROCESSING SYSTEM CONTROLLING MULTIPLE MEMORY SYSTEMS

(71) Applicant: Kioxia Corporation, Tokyo (JP)

(72) Inventors: Hiroyasu Nakatsuka, Tokyo (JP); Koichi Nagai, Tokyo (JP)

(73) Assignee: Kioxia Corporation, Tokyo (JP)

( * ) Notice: Subject to any disclaimer, the term of this patent is extended or adjusted under 35 U.S.C. 154(b) by 45 days.

(21) Appl. No.: 18/207,932

(22) Filed: Jun. 9, 2023

(65) Prior Publication Data

US 2024/0248797 A1  Jul. 25, 2024

(30) Foreign Application Priority Data

Jan. 20, 2023 (JP) ................. 2023-007397

(51) Int. Cl.
*G06F 11/00* (2006.01)
*G06F 11/07* (2006.01)
*G06F 11/10* (2006.01)

(52) U.S. Cl.
CPC ...... *G06F 11/1076* (2013.01); *G06F 11/0787* (2013.01); *G06F 11/1088* (2013.01)

(58) Field of Classification Search
CPC ........................................... G06F 11/08–1096
See application file for complete search history.

(56) References Cited

U.S. PATENT DOCUMENTS

| | | | | |
|---|---|---|---|---|
| 10,102,070 B2 * | 10/2018 | Nomura | ............. | G06F 11/1076 |
| 10,761,738 B2 | 9/2020 | Zagade et al. | | |
| 11,175,984 B1 * | 11/2021 | Lercari | ............... | G06F 11/0784 |
| 11,442,661 B2 | 9/2022 | Kotzur | | |
| 2018/0018231 A1 * | 1/2018 | Okada | ................. | G06F 11/1076 |
| 2018/0341548 A1 * | 11/2018 | Bolkhovitin | ........ | G06F 11/1068 |
| 2020/0042389 A1 * | 2/2020 | Kulkarni | ............. | G06F 11/2094 |
| 2021/0117123 A1 | 4/2021 | Jakowski et al. | | |
| 2022/0137835 A1 | 5/2022 | Malakapalli et al. | | |
| 2022/0187992 A1 | 6/2022 | Malakapalli et al. | | |
| 2023/0082403 A1 * | 3/2023 | Trika | .................... | G06F 11/108 714/764 |
| 2024/0103731 A1 | 3/2024 | Saluja | | |
| 2024/0232009 A1 | 7/2024 | Rai et al. | | |

OTHER PUBLICATIONS

Graid Technology Inc., "Graid SupremeRAIDTM—A Data Protection Solution for NVMe SSDs", Nov. 2020, pp. 1-13, https://www.graidtech.com/post/graid-revealsthe-next-generation-of-enterprise-dataprotection-nvme-ssds.

* cited by examiner

*Primary Examiner* — Michael Maskulinski
(74) *Attorney, Agent, or Firm* — Maier & Maier, PLLC

(57) ABSTRACT

According to one embodiment, an information processing system includes a host and memory systems. A first memory system stores first data in a nonvolatile memory. A second memory system stores second data in a nonvolatile memory. The host transmits first update data to the first memory system and transmits second update data to the second memory system. The first memory system generates first XOR data by performing an XOR operation on at least the first data and the first update data, and transmits the first XOR data to the second memory system. The second memory system generates second XOR data by performing an XOR operation on the second data, the second update data, and the first XOR data, and transmits the second XOR data to a third memory system.

12 Claims, 16 Drawing Sheets

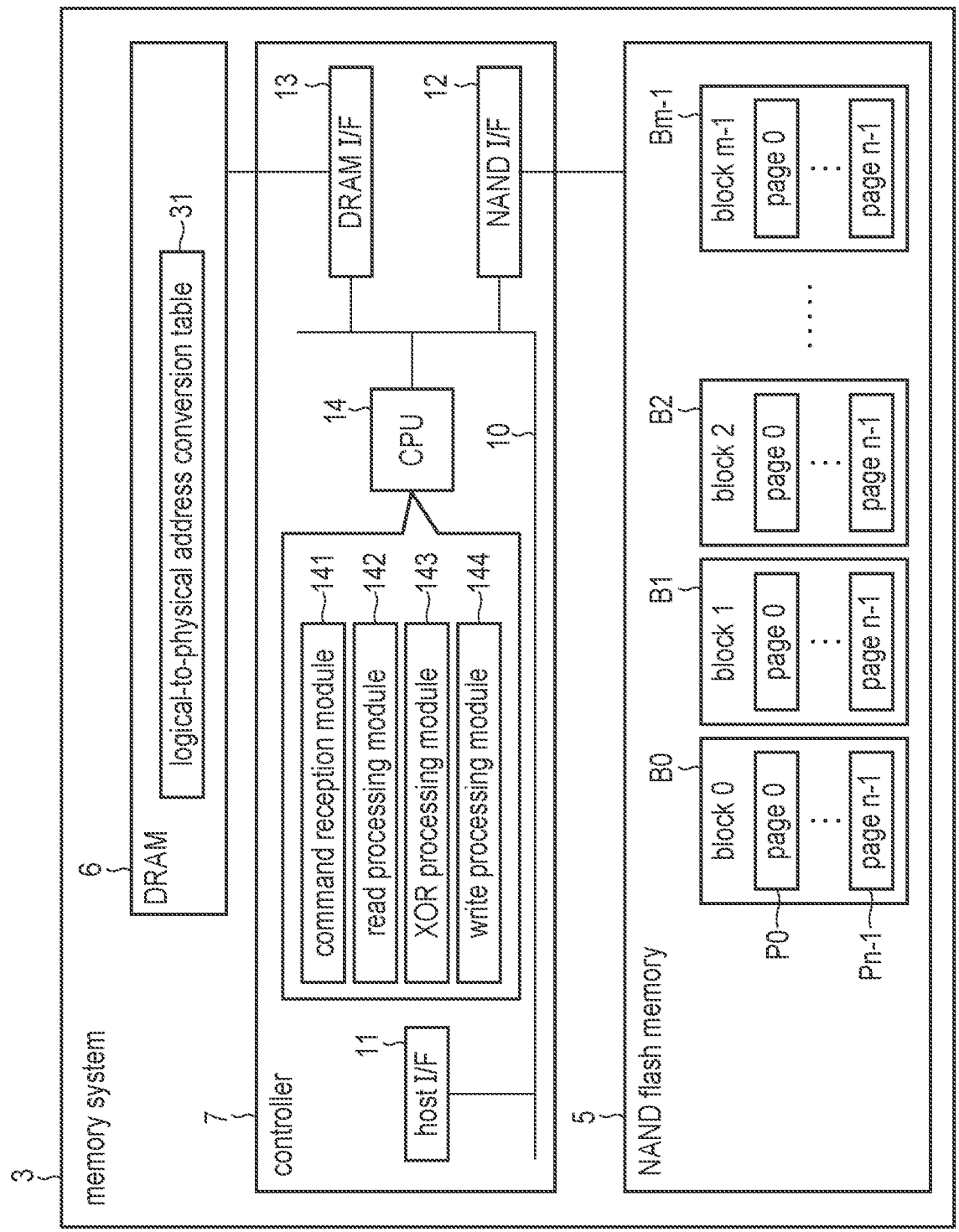
F I G. 2

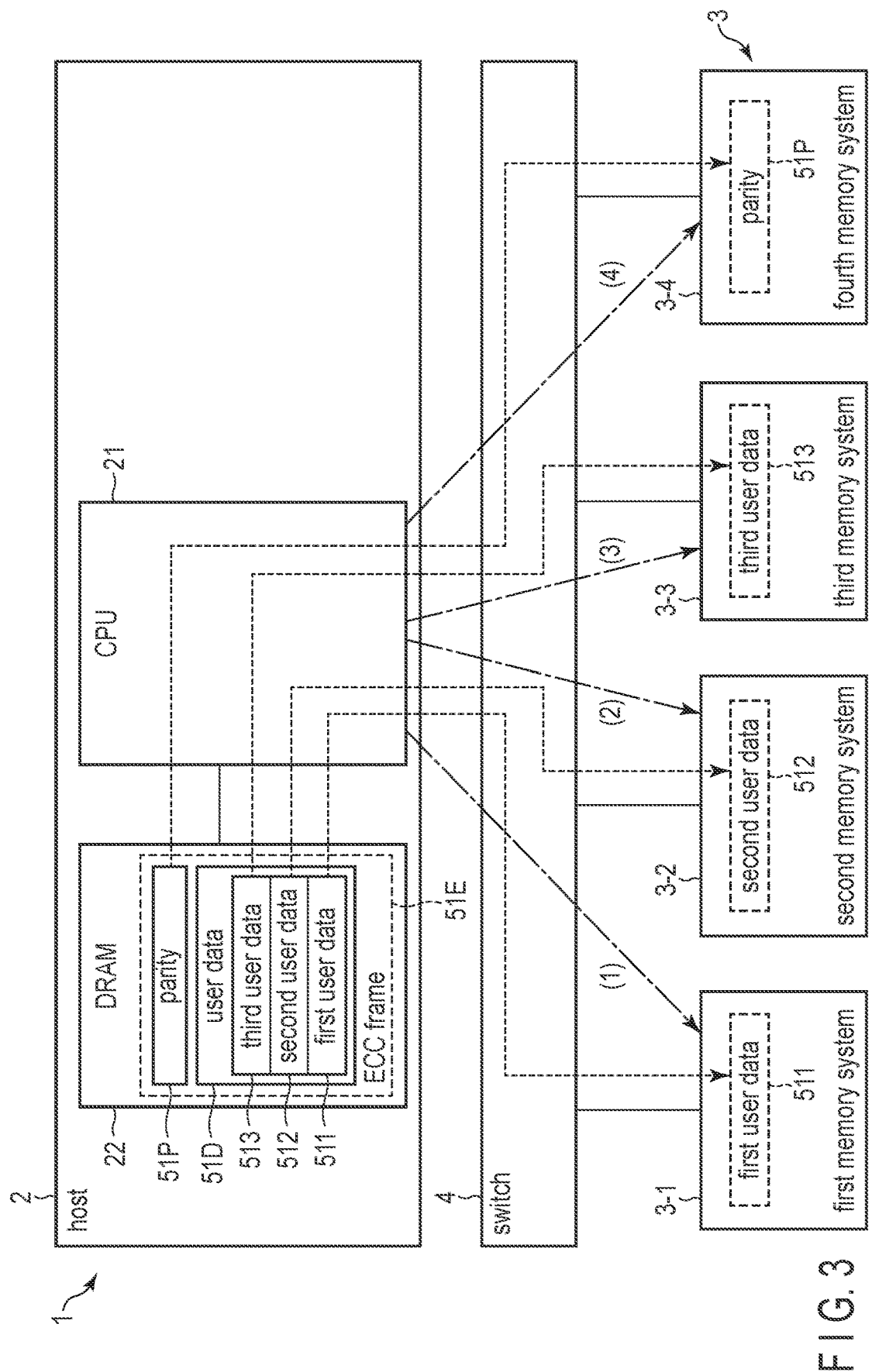
F I G. 3

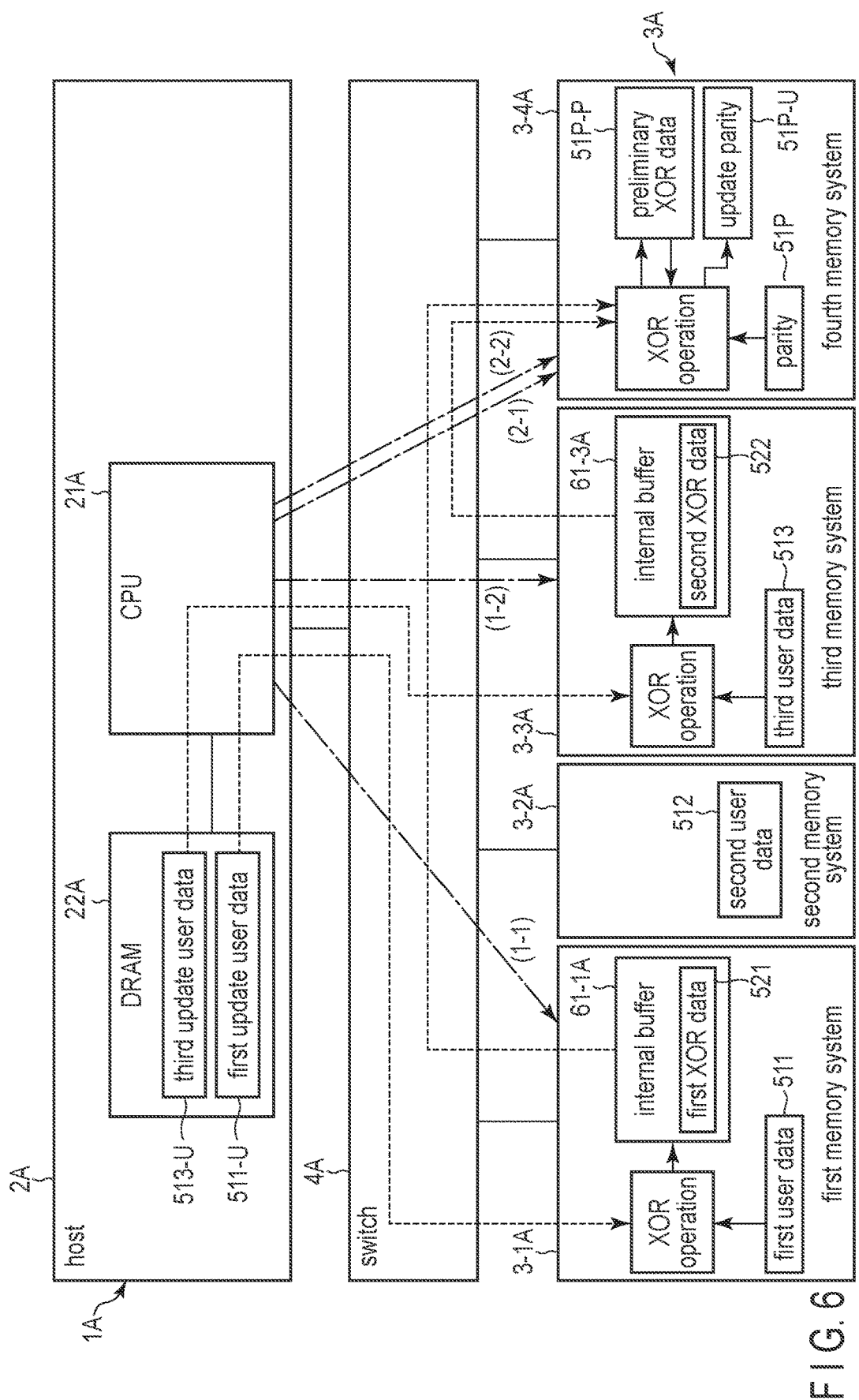
F I G. 6

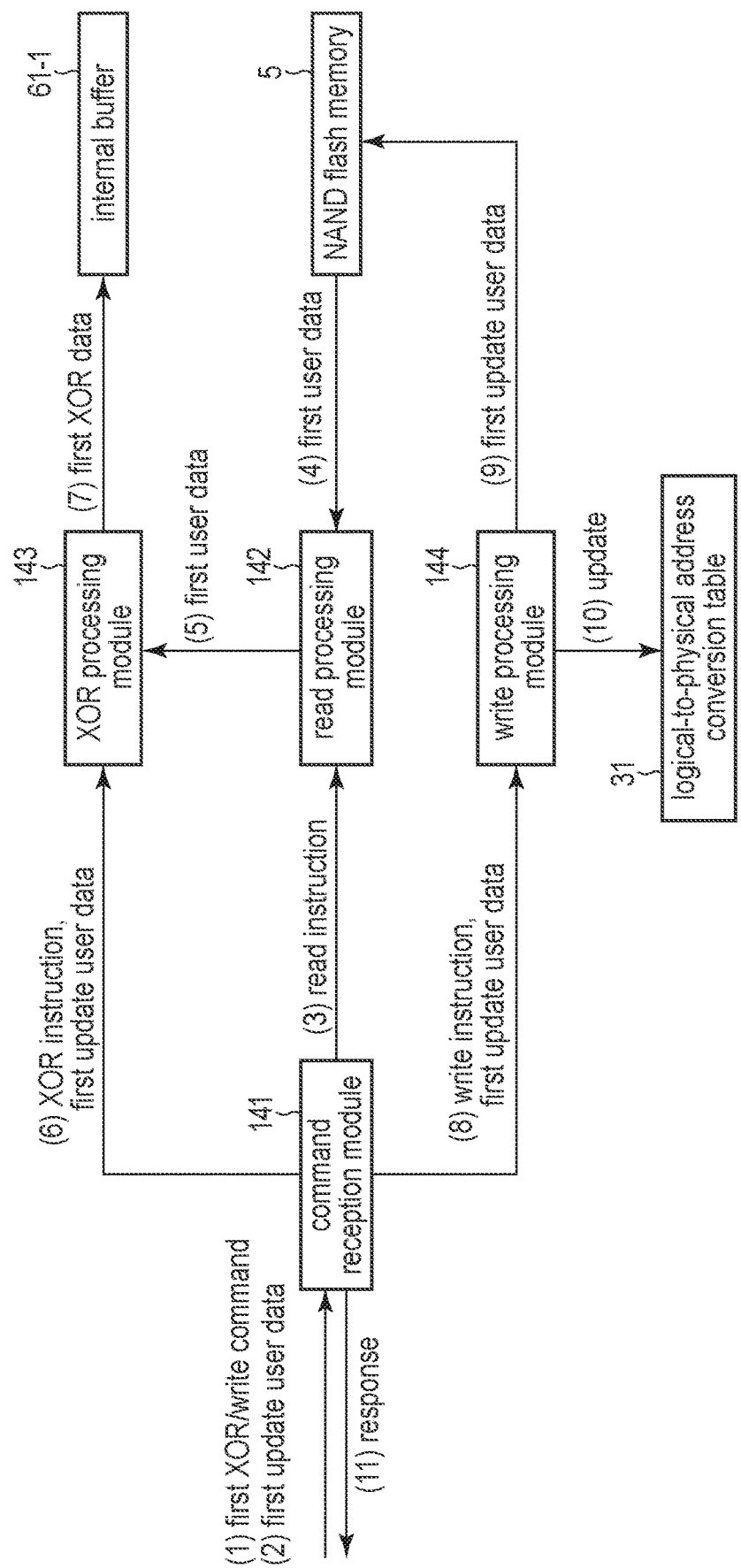
F I G. 9

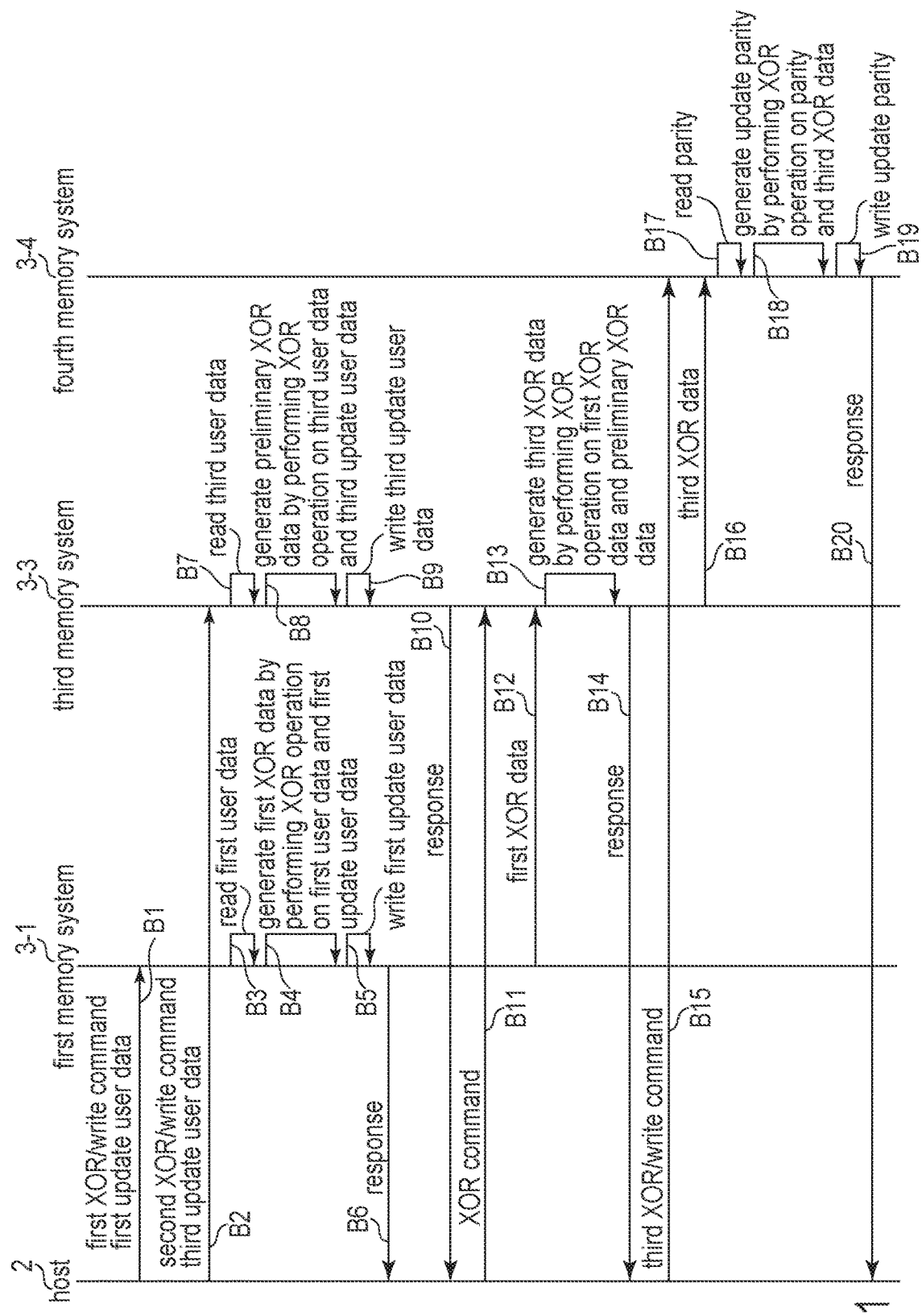
F I G. 11

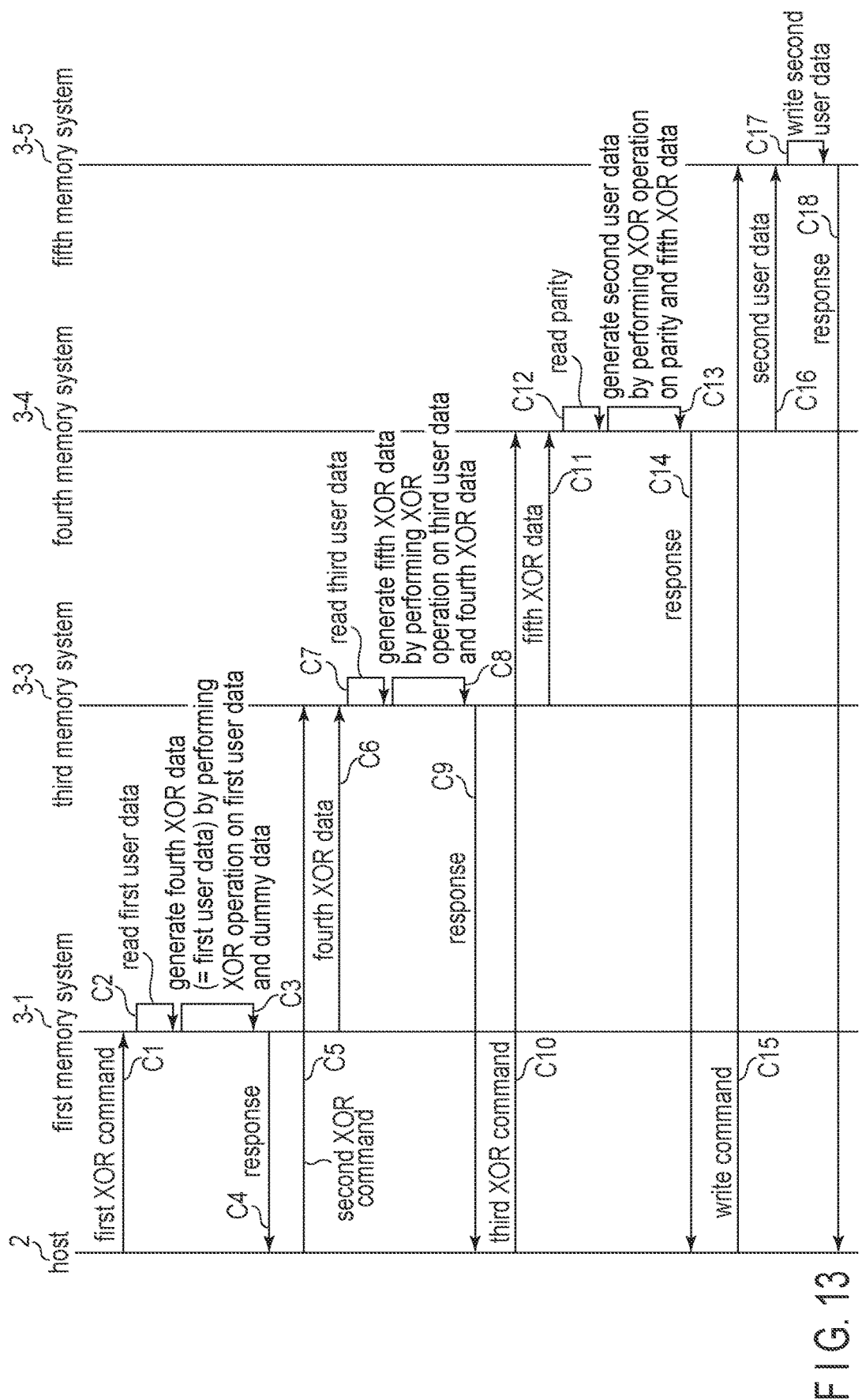
F I G. 13

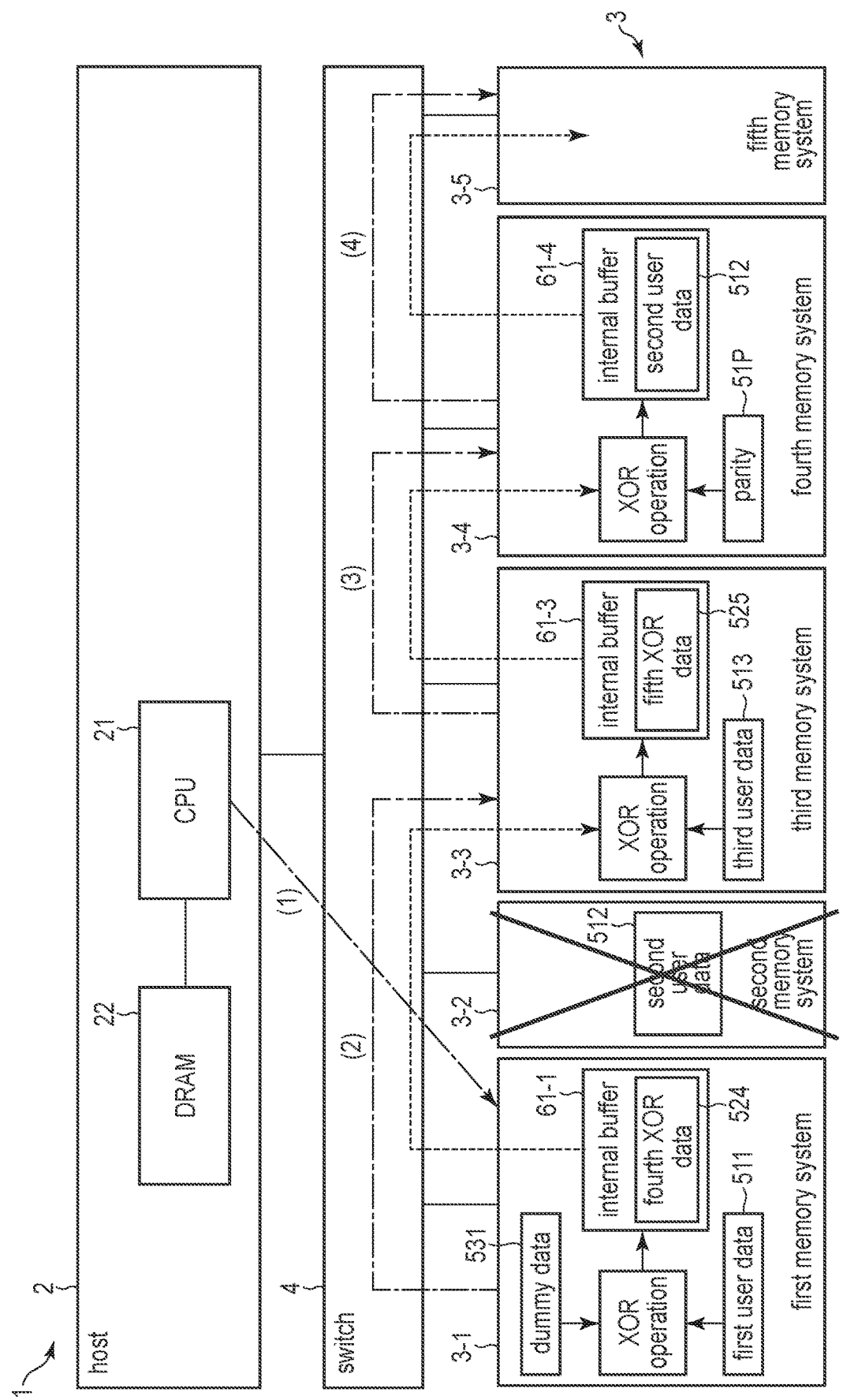
F I G. 14

INFORMATION PROCESSING SYSTEM CONTROLLING MULTIPLE MEMORY SYSTEMS

CROSS-REFERENCE TO RELATED APPLICATIONS

This application is based upon and claims the benefit of priority from Japanese Patent Application No. 2023-007397, filed Jan. 20, 2023, the entire contents of which are incorporated herein by reference.

FIELD

Embodiments described herein relate generally to an information processing system that includes a memory system including a nonvolatile memory.

BACKGROUND

In recent years, memory systems that include a nonvolatile memory and information processing systems that include a host and multiple memory systems are widely used. As one of such memory systems, a solid state drive (SSD) that includes a NAND flash memory is known. The SSD is used as a main storage for various computing devices.

Redundant Arrays of Independent (Inexpensive) Disks (RAID) may be used to improve a fault tolerance of an information processing system. The RAID is a technology for improving redundancy of stored data and access performance by using multiple memory systems for storing data. For example, in RAID-5, data to be written and a parity (e.g., error correction code: ECC) for the data are distributed and stored to the memory systems. As a result, for example, even when a memory system which stores a portion of the data fails, the portion of the data stored in the failed memory system can be restored by using the other portions of the data and the parity that are stored in the other memory systems.

In a case where data stored in the memory systems that are configured as RAID is updated, or, in a case where data stored in a failed memory system is restored and the RAID is reconstructed (rebuilt), a load on a host that is connected to the memory systems may increase. In addition, in such a case, data transfer to a specific memory system may be congested. An insufficient bandwidth of a bus to the specific memory system may degrade performance of the whole of the information processing system.

BRIEF DESCRIPTION OF THE DRAWINGS

FIG. 2 is a block diagram illustrating an example of a configuration of a memory system included in the information processing system according to the first embodiment.

FIG. 3 is a diagram illustrating an example of a sequential write operation in the information processing system according to the first embodiment.

FIG. 6 is a diagram illustrating a third update operation in the information processing system according to the comparative embodiment.

FIG. 9 is a diagram illustrating a specific example of an operation in a first memory system of the information processing system according to the first embodiment.

FIG. 11 is a sequence diagram illustrating a specific example of the fifth update operation in the information processing system according to the first embodiment.

FIG. 13 is a sequence diagram illustrating a specific example of the first rebuild operation in the information processing system according to the second embodiment.

FIG. 14 is a diagram illustrating an example of a second rebuild operation in the information processing system according to the second embodiment.

DETAILED DESCRIPTION

In general, according to one embodiment, an information processing system includes a host and a plurality of memory systems. The plurality of memory systems each include a controller and a nonvolatile memory. The plurality of memory systems includes at least a first memory system, a second memory system, and a third memory system. The controller of the first memory system stores first data in a first nonvolatile memory. The controller of the second memory system stores second data in a second nonvolatile memory. The first data and the second data constitute at least a part of an error correction code frame. In a case where the first data and the second data are updated, the host transmits, to the first memory system, first update data updated from the first data, and transmits, to the second memory system, second update data updated from the second data. The controller of the first memory system generates first exclusive-logical-OR data by performing an exclusive-logical-OR operation on at least the first data and the first update data, and transmits the first exclusive-logical-OR data to the second memory system. The controller of the second memory system generates second exclusive-logical-OR data by performing an exclusive-logical-OR operation on the second data, the second update data, and the first exclusive-logical-OR data, and transmits the second exclusive-logical-OR data to the third memory system.

Various embodiments will be described hereinafter with reference to the accompanying drawings.

First Embodiment

Figure 1:
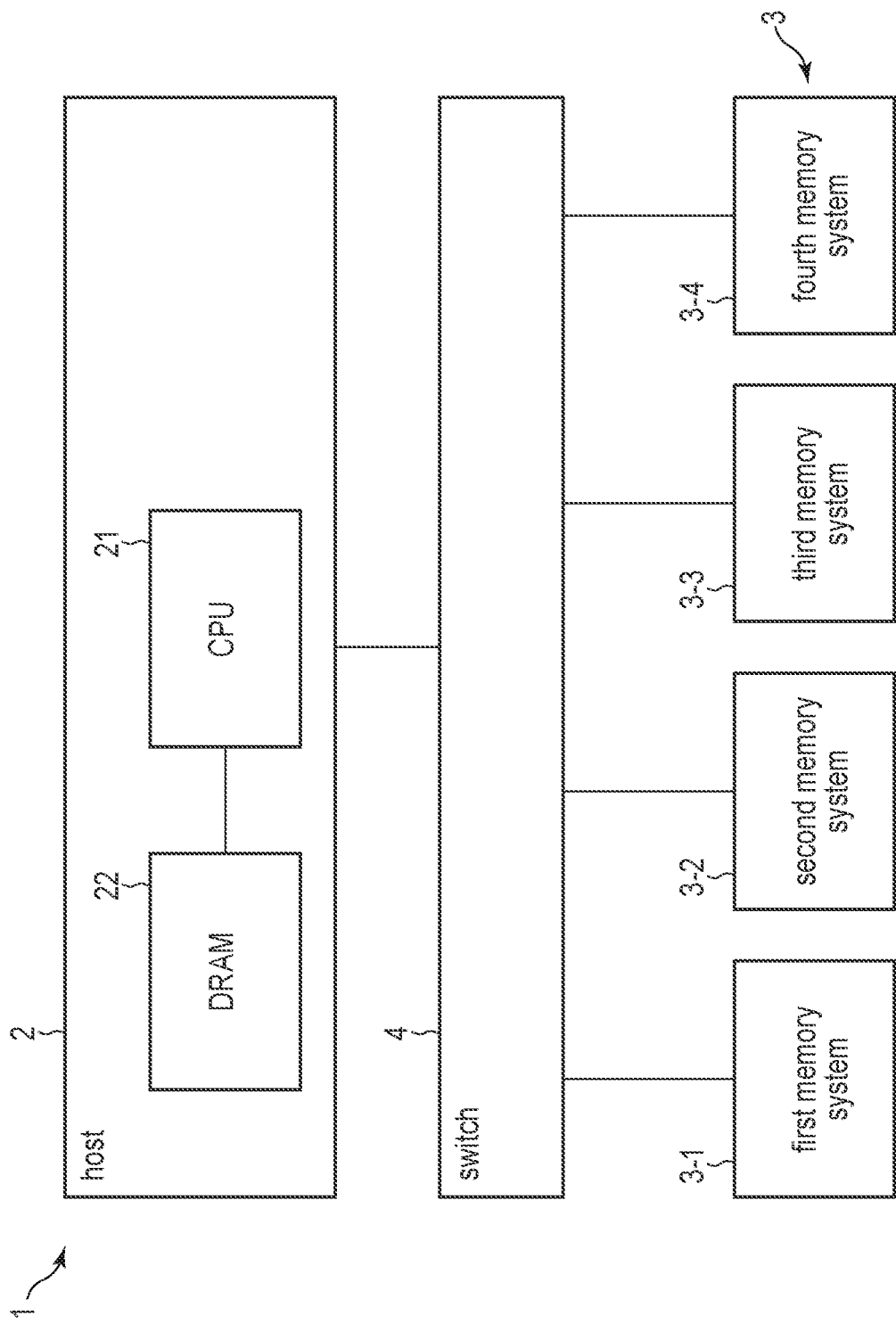
FIG. 1 is a block diagram illustrating an example of a configuration of an information processing system according to a first embodiment.

First, a configuration of an information processing system 1 according to a first embodiment will be described with reference to FIG. 1. The information processing system 1 includes a host device 2, multiple memory systems 3, and a switch 4.

The host device 2 may be a storage server that stores a large amount of various data in the memory systems 3, or may be a server or a personal computer. Hereinafter, the host device 2 is also referred to as a host 2.

The memory systems 3 are memory systems that are configured as Redundant Arrays of Independent Disks (RAID). Hereinafter, a case where the memory systems 3 are configured as RAID-5 will be explained. In addition, FIG. 1 illustrates a case where the memory systems 3 are four memory systems 3-1, 3-2, 3-3, and 3-4. The number of memory systems 3 is, for example, any number of three or more. Hereinafter, one memory system 3 that is not specified among the memory systems 3 is also referred to as a memory system 3.

The memory system 3 is a semiconductor storage device configured to write data to a nonvolatile memory such as a NAND flash memory and read data from the nonvolatile memory. The memory system 3 is also referred to as a storage device. The memory system 3 is realized as, for example, a solid state drive (SSD).

The memory system 3 may be used as a storage of the host 2. The memory system 3 may be provided inside the host 2 or may be connected to the host 2 via a cable or a network.

The switch 4 is a device that connects the host 2 and the memory systems 3 to each other. The switch 4 includes a control circuit that controls communication between the host 2 and the memory systems 3.

An interface for connecting the host 2 and the memory systems 3 via the switch 4 conforms to standards such as PCI Express™ (PCIe™) and NVM Express™ (NVMe™). Hereinafter, the switch 4 is also referred to as a PCIe switch 4.

An example of a configuration of each of the host 2 and the memory system 3 will be described below.
(Configuration Example of Host 2)

The host 2 includes, for example, a central processing unit (CPU) 21 and a random access memory (RAM) 22.

The CPU 21 is, for example, at least one processor. The CPU 21 controls operations of various components of the host 2. In addition, the CPU 21 controls communication between the host 2 and the memory system 3. The CPU 21 transmits various commands to the memory system 3. The commands transmitted to the memory system 3 include, for example, a read command, a write command, an XOR command, and an XOR/write command. The XOR command is a command for requesting an exclusive logical OR (XOR) operation on two or more pieces of data. The XOR/write command is a command for requesting an XOR operation on two or more pieces of data and a write operation of data. Note that the host 2 may include a control circuit (interface) that controls communication between the host 2 and the memory system 3. The CPU 21 communicates with the memory system 3 via the control circuit.

The RAM 22 is a volatile memory. The RAM 22 is realized, for example, as a dynamic random access memory (DRAM) or a static random access memory (SRAM). A storage area of the RAM 22 is allocated, for example, as a buffer area in which data is temporarily stored. The buffer area stores, for example, data to be written to the memory system 3 and data read from the memory system 3.
(Configuration Example of Memory System 3)

FIG. 2 is a block diagram illustrating an example of a configuration of the memory system 3.

The memory system 3 includes, for example, a nonvolatile memory 5, a DRAM 6, and a controller 7.

The nonvolatile memory 5 is, for example, a NAND flash memory. Hereinafter, the nonvolatile memory 5 is referred to as a NAND flash memory 5.

The NAND flash memory 5 includes multiple blocks B0, B1, B2, . . . , and Bm−1. Each of the blocks B0, B1, B2, . . . and Bm−1 includes multiple pages P0, . . . and Pn−1. The blocks each function as the minimum unit of a data erase operation. The block may also be referred to as an erasure block or a physical block. Each of the pages P0, . . . , and Pn−1 includes memory cells connected to a single word line. The pages each function as a unit of a data write operation and a data read operation. Note that the word line may function as a unit of a data write operation and a data read operation.

The tolerable maximum number of program/erase cycles (maximum number of P/E cycles) for each of the blocks is limited. One P/E cycle of a block includes a data erase operation to erase data stored in all memory cells in the block and a data write operation (also referred to as a data program operation) to write data in each page of the block.

The DRAM 6 is a volatile memory. The DRAM 6 includes, for example, a storage area of firmware (FW), a cache area for a logical-to-physical address conversion table 31, and a buffer area for temporarily storing data.

The FW is a program for controlling an operation of the controller 7. The FW is loaded from the NAND flash memory 5 to the DRAM 6, for example.

The logical-to-physical address conversion table 31 manages mapping between each logical address and each physical address of the NAND flash memory 5. The logical address is an address used by the host 2 for addressing the memory system 3. The logical address is, for example, a logical block address (LBA).

The controller 7 functions as a memory controller configured to control the NAND flash memory 5.

The controller 7 may function as a flash translation layer (FTL) configured to execute data management and block management of the NAND flash memory 5. The data management executed by the FTL includes (1) management of mapping data indicative of a relationship between each logical address and each physical address of the NAND flash memory 5, and (2) process to hide a difference between data read operations/data write operations in units of page and data erase operations in units of block. The block management includes management of defective blocks, wear leveling, and garbage collection.

Management of mapping between each logical address and each physical address is executed by using the logical-to-physical address conversion table 31. The controller 7 uses the logical-to-physical address conversion table 31 to manage the mapping between each logical address and each physical address in a certain management size. A physical address corresponding to a logical address indicates a physical memory location in the NAND flash memory 5 to which data of the logical address is written. The controller 7 manages multiple storage areas that are obtained by logically dividing the storage area of the NAND flash memory 5, using the logical-to-physical address conversion table 31. The multiple storage areas correspond to multiple logical addresses, respectively. In other words, each of the storage areas is identified by one logical address. The logical-to-physical address conversion table 31 may be loaded from the NAND flash memory 5 to the DRAM 6 when the memory system 3 is boot up.

The data write operation into one page is executable only once in a single P/E cycle. Thus, the controller 7 writes updated data corresponding to a logical address not to an original physical memory location in which previous data corresponding to the logical address is stored but to a different physical memory location. Then, the controller 7 updates the logical-to-physical address conversion table 31 to associate the logical address with this different physical memory location rather than the original physical memory location, and to invalidate the previous data. Data to which the logical-to-physical address conversion table 31 refers (that is, data associated with a logical address) will be referred to as valid data. Furthermore, data not associated with any logical address in the logical-to-physical address conversion table 31 will be referred to as invalid data. The valid data is data to possibly be read by the host 2 later. The invalid data is data not to be read by the host 2 anymore.

The controller 7 includes, for example, a host interface (host I/F) 11, a NAND interface (NAND I/F) 12, a DRAM interface (DRAM I/F) 13, and a CPU 14. The host I/F 11, the NAND I/F 12, the DRAM I/F 13, and the CPU 14 are connected via, for example, a bus 10.

The host I/F 11 functions as a circuit that receives various commands and data from the host 2 via the PCIe switch 4. In addition, the host I/F 11 functions as a circuit that transmits responses to commands and data, to the host 2 via the PCIe switch 4. Further, the host I/F 11 may function as a circuit that receives various commands, data, and responses to commands, from another memory system 3 via the PCIe switch 4. In addition, the host I/F 11 may function as a circuit that transmits commands, data, and responses to commands, to another memory system 3 via the PCIe switch 4.

The NAND I/F 12 electrically connects the controller 7 and the NAND flash memory 5. The NAND I/F 12 conforms to an interface standard such as a toggle double data rate (DDR) and an open NAND flash Interface (ONFI).

The NAND I/F 12 functions as a NAND control circuit configured to control the NAND flash memory 5. The NAND I/F 12 may be connected to memory chips in the NAND flash memory 5 via multiple channels. By operating the memory chips in parallel, it is possible to broaden an access bandwidth between the controller 7 and the NAND flash memory 5.

The DRAM I/F 13 functions as a DRAM control circuit configured to control access to the DRAM 6.

The CPU 14 is a processor configured to control the host I/F 11, the NAND I/F 12, and the DRAM I/F 13. The CPU 14 performs various processes by executing the FW loaded from the NAND flash memory 5 onto the DRAM 6. The FW is a control program including instructions for causing the CPU 14 to execute various processes. The CPU 14 may perform command processes to process various commands from the host 2. The operation of the CPU 14 is controlled by the FW executed by the CPU 14.

The function of each unit in the controller 7 may be realized by dedicated hardware in the controller 7 or may be realized by the CPU 14 executing the FW.

The CPU 14 functions as, for example, a command reception module 141, a read processing module 142, an XOR processing module 143, and a write processing module 144. The CPU 14 functions as these modules, for example, by executing the FW.

The command reception module 141 receives a command transmitted from the host 2 or another memory system 3. The command reception module 141 controls the read processing module 142, the XOR processing module 143, and the write processing module 144 on the basis of the received command. Specifically, the command reception module 141 instructs the read processing module 142 to read data from the NAND flash memory 5. The command reception module 141 instructs the XOR processing module 143 to perform an XOR operation on two or more pieces of data. The command reception module 141 instructs the write processing module 144 to write data into the NAND flash memory 5. The command reception module 141 transmits a response to a command, to the host 2 or the memory system 3 that has transmitted the command. In addition, the command reception module 141 may transmit a command and data to another memory system 3.

In response to the instruction from the command reception module 141, the read processing module 142 reads data from the NAND flash memory 5.

In response to the instruction from the command reception module 141, the XOR processing module 143 performs an XOR operation on two or more pieces of data.

In response to the instruction from the command reception module 141, the write processing module 144 writes data into the NAND flash memory 5.

An example of a specific operation by the command reception module 141, the read processing module 142, the XOR processing module 143, and the write processing module 144 will be described later with reference to FIG. 9.

Here, a sequential write operation in the information processing system 1 will be described.

FIG. 3 illustrates an example of a sequential write operation in the information processing system 1. The sequential write operation is an operation in which the host 2 continuously writes data to all the four memory systems 3-1, 3-2, 3-3, and 3-4.

The DRAM 22 of the host 2 stores user data 51D to be written to the memory systems 3.

When an amount of the user data 51D to be written to the memory systems 3 has reached a specific unit, the CPU 21 of the host 2 generates an error correction code (ECC) for the user data 51D to be written. The specific unit corresponds to, for example, a total amount of a plurality pieces of data each capable of being written in one data write operation in each of three memory systems 3. The amount of data that is capable of being written in one data write operation in one memory system 3 is also referred to as a write unit. The ECC is data for correcting user data in which an error has occurred. The ECC is, for example, an XOR parity. Hereinafter, a case where the ECC is the XOR parity will be explained. In addition, the XOR parity is simply referred to as a parity.

Specifically, the CPU 21 acquires three pieces of user data 511, 512, and 513 of the write units (that is, first user data 511, second user data 512, and third user data 513) that are obtained by dividing the user data 51D of the specific unit. Then, the CPU 21 performs an XOR operation on the three pieces of user data 511, 512, and 513, thereby generating a parity 51P. The CPU 21 stores the generated parity 51P in the DRAM 22, for example. Each of the three pieces of user data 511, 512, and 513 and the parity 51P have the same data length. The three pieces of user data 511, 512, and 513 and the parity 51P constitute one ECC frame 51E. The ECC frame is a data unit including a parity and user data that is protected by the parity. That is, the three pieces of user data 511, 512, and 513 are protected by the parity 51P. The parity 51P is updated in response to at least one of the three pieces of user data 511, 512, and 513 being updated.

Next, the CPU 21 writes the three pieces of user data 511, 512, and 513 and the parity 51P to the four memory systems 3-1, 3-2, 3-3, and 3-4, respectively, via the PCIe switch 4.

Specifically, for example, the CPU 21 transmits a write command for requesting the writing of the first user data

511, to the first memory system 3-1 ((1) in FIG. 3). The CPU 21 transmits a write command for requesting the writing of the second user data 512, to the second memory system 3-2 ((2) in FIG. 3). The CPU 21 transmits a write command for requesting the writing of the third user data 513, to the third memory system 3-3 ((3) in FIG. 3). The CPU 21 transmits a write command for requesting the writing of the parity 51P, to the fourth memory system 3-4 ((4) in FIG. 3). Note that one of the four memory systems 3-1, 3-2, 3-3, and 3-4 to which each of the first user data 511, the second user data 512, the third user data 513, and the parity 51P is to be written is determined by the CPU 21 according to a specific rule, for example. The write destinations of the first user data 511, the second user data 512, the third user data 513, and the parity 51P are not limited to the above-described examples. For example, the CPU 21 may transmit the write commands such that the first user data 511 is written to the second memory system 3-2, the second user data 512 is written to the third memory system 3-3, the third user data 513 is written to the fourth memory system 3-4, and the parity 51P is written to the first memory system 3-1.

In response to receiving the write command from the host 2, the first memory system 3-1 receives the first user data 511 stored in the DRAM 22 of the host 2 via the PCIe switch 4. Then, the first memory system 3-1 writes the first user data 511 into the NAND flash memory 5 of the first memory system 3-1.

In response to receiving the write command from the host 2, the second memory system 3-2 receives the second user data 512 stored in the DRAM 22 of the host 2 via the PCIe switch 4. Then, the second memory system 3-2 writes the second user data 512 into the NAND flash memory 5 of the second memory system 3-2.

In response to receiving the write command from the host 2, the third memory system 3-3 receives the third user data 513 stored in the DRAM 22 of the host 2 via the PCIe switch 4. Then, the third memory system 3-3 writes the third user data 513 into the NAND flash memory 5 of the third memory system 3-3.

In response to receiving the write command from the host 2, the fourth memory system 3-4 receives the parity 51P stored in the DRAM 22 of the host 2 via the PCIe switch 4. Then, the fourth memory system 3-4 writes the parity 51P into the NAND flash memory 5 of the fourth memory system 3-4.

By the sequential write operation described above, in the information processing system 1, the first user data 511, the second user data 512, the third user data 513, and the parity 51P, which constitute one ECC frame 51E, are written in the four memory systems 3-1, 3-2, 3-3, and 3-4 in a distributed manner. As a result, for example, even when any one of the four memory systems 3-1, 3-2, 3-3, and 3-4 fails, the data stored in the failed memory system 3 can be restored by using the data stored in the other memory systems 3.

Note that in the sequential write operation, four input/outputs (I/Os) are performed between the host 2 and the memory systems 3. The four I/Os are I/Os related to four write operations from the host 2 to the memory systems 3 (i.e., write I/Os). The number of times of input/output is a criterion related to use of a bus bandwidth by communication between the host 2 and the memory systems 3 via the PCIe switch 4. In addition, the parity 51P is generated by using resources of the host 2 (more specifically, the CPU 21 and the DRAM 22).

Next, an operation for updating a portion of the user data 51D written in the memory systems 3 will be described. The operation for updating a portion of the user data 51D written in the memory systems 3 is referred to as an update operation. The update operation includes a random write operation.

First, an update operation in an information processing system 1A according to a comparative embodiment will be described with reference to FIGS. 4 to 6. The information processing system 1A according to the comparative embodiment includes a host 2A, multiple memory systems 3A, and a PCIe switch 4A. The host 2A and the memory systems 3A are capable of communicating with each other via the PCIe switch 4A. The host 2A includes a CPU 21A and a DRAM 22A. Each of the memory systems 3A includes a NAND flash memory. The memory systems 3A are configured as RAID-5. The memory systems 3A include four memory systems 3-1A, 3-2A, 3-3A, and 3-4A. Here, it is assumed that the first user data 511, the second user data 512, the third user data 513, and the parity 51P are stored respectively in the four memory systems 3-1A, 3-2A, 3-3A, and 3-4A by the same operation as the sequential write operation described above with reference to FIG. 3.

Figure 4:
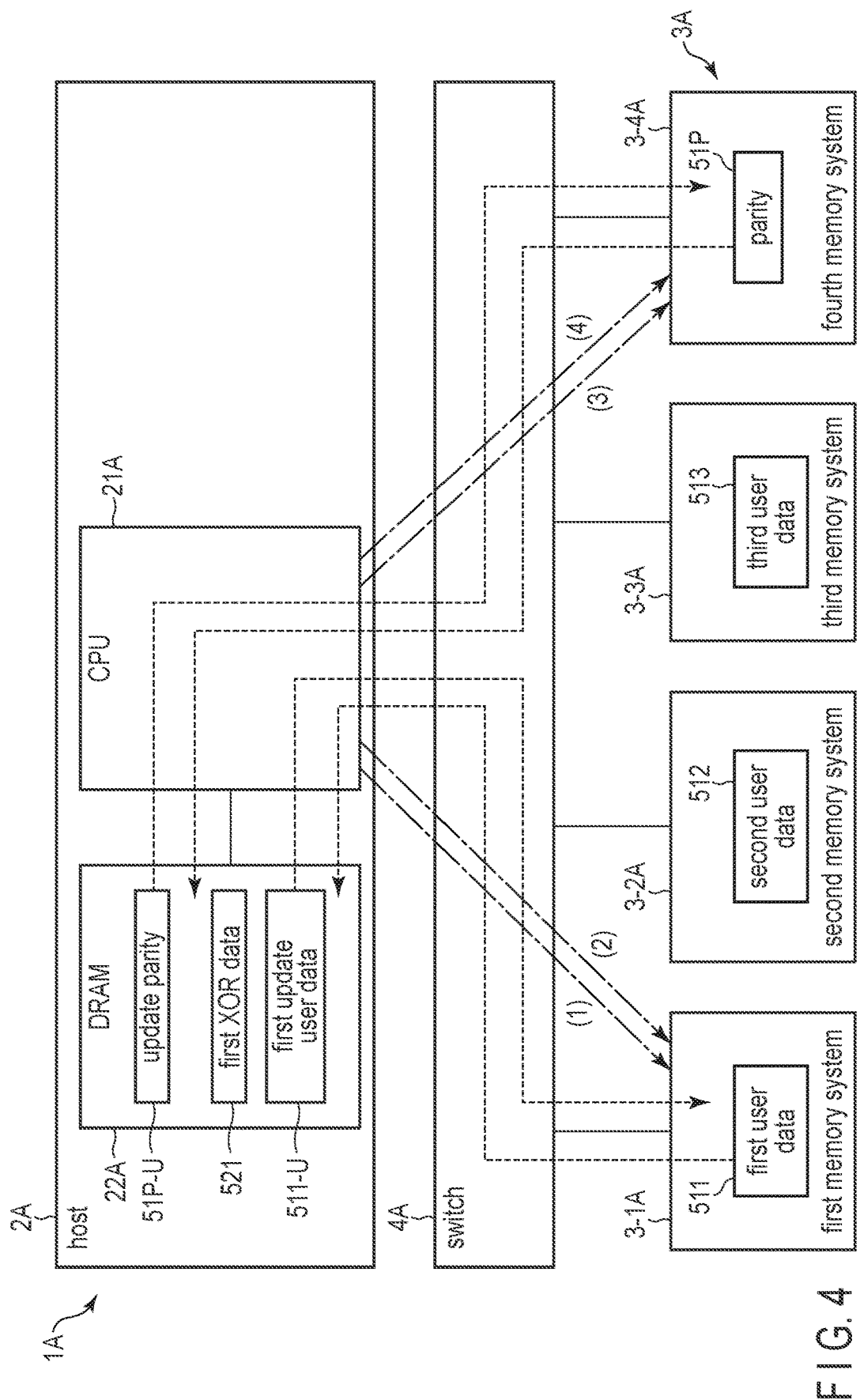
FIG. 4 is a diagram illustrating a first update operation in an information processing system according to a comparative embodiment.

FIG. 4 illustrates a first update operation in the information processing system 1A according to the comparative embodiment. The first update operation is an operation for updating the first user data 511, which is stored in the first memory system 3-1A, with first update user data 511-U.

The DRAM 22A of the host 2A stores the first update user data 511-U.

The CPU 21A of the host 2A transmits a read command for requesting the reading of the first user data 511 to the first memory system 3-1A ((1) in FIG. 4).

In response to receiving the read command from the host 2A, the first memory system 3-1A reads the first user data 511 from the NAND flash memory of the first memory system 3-1A. Then, the first memory system 3-1A transmits the first user data 511 to the host 2A.

The CPU 21A of the host 2A stores the first user data 511 that has been received from the first memory system 3-1A, in the DRAM 22A. The CPU 21A performs an XOR operation on the first user data 511 and the first update user data 511-U, thereby generating first XOR data 521. The first XOR data 521 is stored in the DRAM 22A, for example. Then, the CPU 21A transmits a write command for requesting the writing of the first update user data 511-U, to the first memory system 3-1A ((2) in FIG. 4).

In response to receiving the write command from the host 2A, the first memory system 3-1A receives the first update user data 511-U stored in the DRAM 22A of the host 2A. Then, the first memory system 3-1A writes the first update user data 511-U into the NAND flash memory of the first memory system 3-1A.

Next, the CPU 21A of the host 2A transmits a read command for requesting the reading of the parity 51P to the fourth memory system 3-4A ((3) in FIG. 4).

In response to receiving the read command from the host 2A, the fourth memory system 3-4A reads the parity 51P from the NAND flash memory of the fourth memory system 3-4A. Then, the fourth memory system 3-4A transmits the parity 51P to the host 2A.

The CPU 21A of the host 2A stores the parity 51P that has been received from the fourth memory system 3-4A, in the DRAM 22A. The CPU 21A performs an XOR operation on the first XOR data 521 and the parity 51P that are stored in the DRAM 22A, thereby generating an update parity 51P-U. The update parity 51P-U is a parity changed according to the update from the first user data 511 to the first update user data 511-U. That is, the first update user data 511-U, the second user data 512, the third user data 513, and the update parity 51P-U constitute an ECC frame. The CPU 21A transmits a write command for requesting the writing of the update parity 51P-U, to the fourth memory system 3-4A ((4) in FIG. 4).

In response to receiving the write command from the host 2A, the fourth memory system 3-4A receives the update parity 51P-U stored in the DRAM 22A of the host 2A. Then, the fourth memory system 3-4A writes the update parity 51P-U into the NAND flash memory of the fourth memory system 3-4A.

By the first update operation described above, in the information processing system 1A, the first user data 511 stored in the first memory system 3-1A is updated with the first update user data 511-U, and the parity 51P stored in the fourth memory system 3-4A is updated with the update parity 51P-U.

In the first update operation, four I/Os from the host 2A to the memory systems 3A are performed. The four I/Os include two write I/Os and I/Os related to two read operations (i.e., two read I/Os) from the host 2A to the memory systems 3A. In addition, the update parity 51P-U is generated by using resources of the host 2A (more specifically, the CPU 21A and the DRAM 22A).

Figure 5:
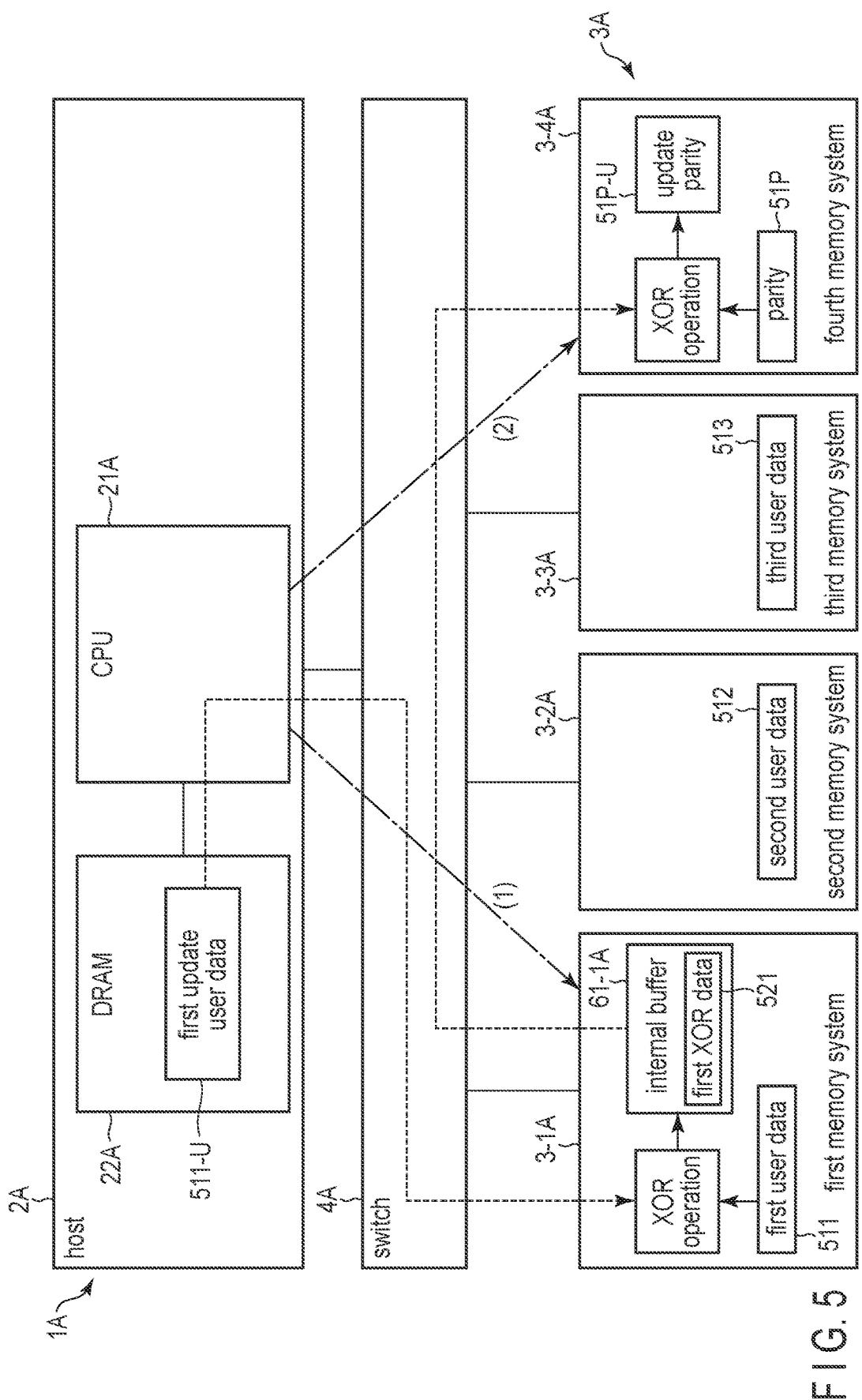
FIG. 5 is a diagram illustrating a second update operation in the information processing system according to the comparative embodiment.

FIG. 5 illustrates a second update operation in the information processing system 1A according to the comparative embodiment. The second update operation is an operation for updating the first user data 511, which is stored in the first memory system 3-1A, with the first update user data 511-U while reducing the resources of the host 2A being used.

The DRAM 22A of the host 2A stores the first update user data 511-U.

The CPU 21A of the host 2A transmits a command for requesting an XOR operation and the writing of the first update user data 511-U (i.e., XOR/write command), to the first memory system 3-1A ((1) in FIG. 5).

In response to receiving the XOR/write command from the host 2A, the first memory system 3-1A receives the first update user data 511-U from the host 2A. In addition, the first memory system 3-1A reads the first user data 511 from the NAND flash memory of the first memory system 3-1A. The first memory system 3-1A performs an XOR operation on the first user data 511 and the first update user data 511-U, thereby generating the first XOR data 521. The first XOR data 521 is stored in an internal buffer 61-1A of the first memory system 3-1A. Then, the first memory system 3-1A writes the first update user data 511-U into the NAND flash memory of the first memory system 3-1A.

Next, the CPU 21A of the host 2A transmits an XOR/write command for requesting an XOR operation and the writing of the update parity 51P-U, to the fourth memory system 3-4A ((2) in FIG. 5).

In response to receiving the XOR/write command from the host 2A, the fourth memory system 3-4A receives the first XOR data 521 from the first memory system 3-1A. The fourth memory system 3-4A reads the parity 51P from the NAND flash memory of the fourth memory system 3-4A. The fourth memory system 3-4A performs an XOR operation on the first XOR data 521 and the parity 51P, thereby generating the update parity 51P-U. Then, the fourth memory system 3-4A writes the update parity 51P-U into the NAND flash memory of the fourth memory system 3-4A.

By the second update operation described above, in the information processing system 1A, the first user data 511 stored in the first memory system 3-1A is updated with the first update user data 511-U, and the parity 51P stored in the fourth memory system 3-4A is updated with the update parity 51P-U.

In the second update operation, two I/Os from the host 2A to the memory systems 3A are performed. The two I/Os are two write I/Os from the host 2A to the memory systems 3A. In the second update operation, any read I/O does not occur. Therefore, in the second update operation, the number of times of read I/Os is reduced as compared with the first update operation described above with reference to FIG. 4. In addition, the update parity 51P-U is generated by using the resources of the memory systems 3A. Therefore, in the second update operation, the load on the host 2A is reduced. In other words, the offloading of the update operation from the host 2A to the memory systems 3A can be realized.

FIG. 6 illustrates a third update operation in the information processing system 1A according to the comparative embodiment. The third update operation is an operation for updating the first user data 511 stored in the first memory system 3-1A with the first update user data 511-U, and updating the third user data 513 stored in the third memory system 3-3A with third update user data 513-U, while reducing the resources of the host 2A being used. That is, in the third update operation, the two pieces of user data 511 and 513 that are stored in the two memory systems 3-1A and 3-3A, respectively, are updated.

The DRAM 22A of the host 2A stores the first update user data 511-U and the third update user data 513-U.

The CPU 21A of the host 2A transmits an XOR/write command (first XOR/write command) for requesting an XOR operation and the writing of the first update user data 511-U, to the first memory system 3-1A ((1-1) in FIG. 6). In addition, the CPU 21A transmits an XOR/write command (second XOR/write command) for requesting an XOR operation and the writing of the third update user data 513-U, to the third memory system 3-3A ((1-2) in FIG. 6).

In response to receiving the first XOR/write command from the host 2A, the first memory system 3-1A receives the first update user data 511-U from the host 2A. The first memory system 3-1A reads the first user data 511 from the NAND flash memory of the first memory system 3-1A. The first memory system 3-1A performs an XOR operation on the first user data 511 and the first update user data 511-U, thereby generating the first XOR data 521. The first XOR data 521 is stored in the internal buffer 61-1A of the first memory system 3-1A. Then, the first memory system 3-1A writes the first update user data 511-U into the NAND flash memory of the first memory system 3-1A.

In addition, in response to receiving the second XOR/write command from the host 2A, the third memory system 3-3A receives the third update user data 513-U from the host 2A. The third memory system 3-3A reads the third user data 513 from the NAND flash memory of the third memory system 3-3A. The third memory system 3-3A performs an XOR operation on the third user data 513 and the third update user data 513-U, thereby generating second XOR data 522. The second XOR data 522 is stored in an internal buffer 61-3A of the third memory system 3-3A. Then, the third memory system 3-3A writes the third update user data 513-U into the NAND flash memory of the third memory system 3-3A.

Next, the CPU 21A of the host 2A transmits an XOR/write command (third XOR/write command) for requesting an XOR operation and the writing of preliminary XOR data 51P-P (described later), to the fourth memory system 3-4A ((2-1) in FIG. 6). Further, the CPU 21A of the host 2A transmits an XOR/write command (fourth XOR/write command) for requesting an XOR operation and the writing of the update parity 51P-U, to the fourth memory system 3-4A ((2-2) in FIG. 6). The host 2A may transmit the fourth XOR/write command to the fourth memory system 3-4A before receiving a response to the third XOR/write command.

In response to receiving the third XOR/write command from the host 2A, the fourth memory system 3-4A receives the first XOR data 521 from the first memory system 3-1A. The fourth memory system 3-4A reads the parity 51P from the NAND flash memory of the fourth memory system 3-4A. The fourth memory system 3-4A performs an XOR operation on the first XOR data 521 and the parity 51P, thereby generating the preliminary XOR data 51P-P. Then, the fourth memory system 3-4A writes the preliminary XOR data 51P-P into the NAND flash memory of the fourth memory system 3-4A.

In response to receiving the fourth XOR/write command from the host 2A, the fourth memory system 3-4A receives the second XOR data 522 from the third memory system 3-3A. The fourth memory system 3-4A reads the preliminary XOR data 51P-P from the NAND flash memory of the fourth memory system 3-4A. The fourth memory system 3-4A performs an XOR operation on the preliminary XOR data 51P-P and the second XOR data 522, thereby generating the update parity 51P-U. Then, the fourth memory system 3-4A writes the update parity 51P-U into the NAND flash memory of the fourth memory system 3-4A.

Note that when having received the fourth XOR/write command prior to the third XOR/write command, the fourth memory system 3-4A performs an XOR operation on the second XOR data 522 and the parity 51P, thereby generating the preliminary XOR data 51P-P. In this case, in response to receiving the third XOR/write command, the fourth memory system 3-4A performs an XOR operation on the preliminary XOR data 51P-P and the first XOR data 521, thereby generating the update parity 51P-U.

By the third update operation described above, in the information processing system 1A, the first user data 511 stored in the first memory system 3-1A is updated with the first update user data 511-U, the third user data 513 stored in the third memory system 3-3A is updated with the third update user data 513-U, and the parity 51P stored in the fourth memory system 3-4A is updated with the update parity 51P-U.

In the third update operation, similarly to the second update operation described above with reference to FIG. 5, the update parity 51P-U is generated by using the resources of the memory systems 3A. Therefore, in the third update operation, the offloading of the update operation from the host 2A to the memory systems 3A can be realized.

However, in the third update operation, the first XOR data 521 is transmitted from the first memory system 3-1A to the fourth memory system 3-4A, and the second XOR data 522 is transmitted from the third memory system 3-3A to the fourth memory system 3-4A. A transmission request of the first XOR data 521 to the fourth memory system 3-4A and a transmission request of the second XOR data 522 to the fourth memory system 3-4A may be generated simultaneously. In this case, one of the transmission requests is made to wait until transmission for the other of the transmission requests is completed. That is, data transfer to the fourth memory system 3-4A that stores the parity 51P may be congested. In addition, a bus connecting each memory system 3A and the PCIe switch 4A has a bus bandwidth smaller than that of a bus connecting the host 2 and the PCIe switch 4. Therefore, an insufficient bus bandwidth for transferring data to the fourth memory system 3-4A may degrade performance of the whole of the information processing system 1A.

In contrast, in the information processing system 1 according to the first embodiment, while the offloading of the update operation from the host 2 to the memory systems 3 can be realized, the congestion of data transfer to the memory system 3 that stores the parity 51P is also prevented. As a result, in the information processing system 1, performance of the whole of the information processing system 1 can be improved while reducing the load on the host 2.

Two examples of the update operation in the information processing system 1 will be described with reference to FIGS. 7 to 11.

Figure 7:
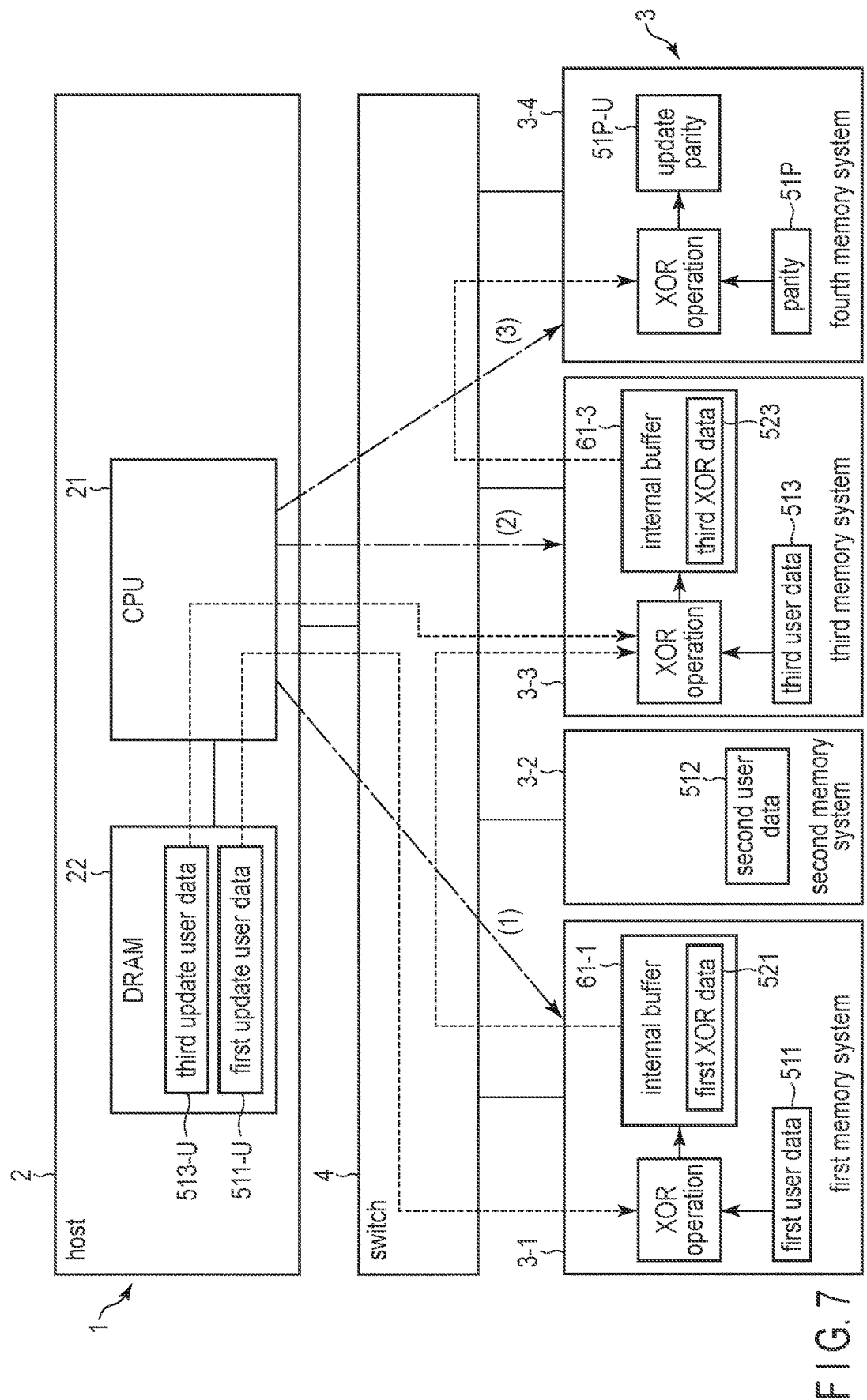
FIG. 7 is a diagram illustrating an example of a fourth update operation in the information processing system according to the first embodiment.

FIG. 7 illustrates an example of a fourth update operation in the information processing system 1. The fourth update operation is an operation for updating user data stored in each of two or more memory systems 3 while reducing the resources of the host 2 being used. Here, a case where the fourth update operation is executed for updating the first user data 511 stored in the first memory system 3-1 with the first update user data 511-U and updating the third user data 513 stored in the third memory system 3-3 with the third update user data 513-U will be explained. Note that it is assumed that the four memory systems 3-1, 3-2, 3-3, and 3-4 store the first user data 511, the second user data 512, the third user data 513, and the parity 51P, respectively, by the sequential write operation described above with reference to FIG. 3. The first user data 511, the second user data 512, the third user data 513, and the parity 51P constitute one ECC frame 51E.

The DRAM 22 of the host 2 stores the first update user data 511-U and the third update user data 513-U.

The CPU 21 of the host 2 transmits an XOR/write command (first XOR/write command) for requesting an XOR operation and the writing of the first update user data 511-U, to the first memory system 3-1 ((1) in FIG. 7). The first XOR/write command may include a logical address of the first user data 511.

In response to receiving the first XOR/write command from the host 2, the first memory system 3-1 receives the first update user data 511-U from the host 2. The first memory system 3-1 reads the first user data 511 from the NAND flash memory 5 of the first memory system 3-1. The first memory system 3-1 performs an XOR operation on the first user data 511 and the first update user data 511-U, thereby generating the first XOR data 521. The first XOR data 521 is stored in an internal buffer 61-1 of the first memory system 3-1. For example, a part of the storage area of the DRAM 6 is allocated as the internal buffer 61-1. The internal buffer 61-1 is, for example, a controller memory buffer (CMB) that is capable of being accessed by the other memory systems 3 via the PCIe switch 4. Since the internal buffer 61-1 is used to store the first XOR data 521, a write amplification factor (WAF) does not increase. The WAF is a value obtained by dividing the amount of data actually written into the NAND flash memory 5 by the amount of data written into the NAND flash memory 5 in accordance with requests from the host 2. The first memory system 3-1 writes the first update user data 511-U into the NAND flash memory 5 of the first memory system 3-1.

Next, the CPU 21 of the host 2 transmits an XOR/write command (second XOR/write command) for requesting an XOR operation and the writing of the third update user data 513-U, to the third memory system 3-3 ((2) in FIG. 7). The second XOR/write command may include a logical address of the third user data 513 and an identifier (for example, an address) of the internal buffer 61-1 of the first memory system 3-1 (more specifically, the storage location of the first XOR data 521).

In response to receiving the second XOR/write command from the host 2, the third memory system 3-3 receives the third update user data 513-U from the host 2 and receives the first XOR data 521 from the first memory system 3-1. In addition, the third memory system 3-3 reads the third user data 513 from the NAND flash memory 5 of the third memory system 3-3. The third memory system 3-3A performs an XOR operation on the third user data 513, the third update user data 513-U, and the first XOR data 521, thereby generating third XOR data 523. The third XOR data 523 is stored in an internal buffer 61-3 of the third memory system 3-3. Then, the third memory system 3-3 writes the third update user data 513-U into the NAND flash memory 5 of the third memory system 3-3.

Next, the CPU 21 of the host 2 transmits an XOR/write command (third XOR/write command) for requesting an XOR operation and the writing of the update parity 51P-U, to the fourth memory system 3-4 ((3) in FIG. 7). The third XOR/write command may include a logical address of the parity 51P and an identifier (for example, an address) of the internal buffer 61-3 of the third memory system 3-3 (more specifically, the storage location of the third XOR data 523).

In response to receiving the third XOR/write command from the host 2, the fourth memory system 3-4 receives the third XOR data 523 from the third memory system 3-3. The fourth memory system 3-4 reads the parity 51P from the NAND flash memory 5 of the fourth memory system 3-4. The fourth memory system 3-4 performs an XOR operation on the third XOR data 523 and the parity 51P, thereby generating the update parity 51P-U. Then, the fourth memory system 3-4 writes the update parity 51P-U into the NAND flash memory 5 of the fourth memory system 3-4.

By the fourth update operation described above, in the information processing system 1, the first user data 511 stored in the first memory system 3-1 is updated with the first update user data 511-U, the third user data 513 stored in the third memory system 3-3 is updated with the third update user data 513-U, and the parity 51P stored in the fourth memory system 3-4 is updated with the update parity 51P-U. In the fourth update operation, the update parity 51P-U is generated by using the resources of the memory systems 3. Therefore, in the fourth update operation, the offloading of the update operation from the host 2 to the memory systems 3 can be realized. Further, in the fourth update operation, the first XOR data 521 is transmitted from the first memory system 3-1 to the third memory system 3-3, and the third XOR data 523 is transmitted from the third memory system 3-3 to the fourth memory system 3-4. As a result, it is possible to prevent the congestion of data transfer to the fourth memory system 3-4 storing the parity 51P.

Therefore, in the information processing system 1 that performs the fourth update operation, performance of the whole of the information processing system 1 can be improved while reducing the load on the host 2.

Figure 8:
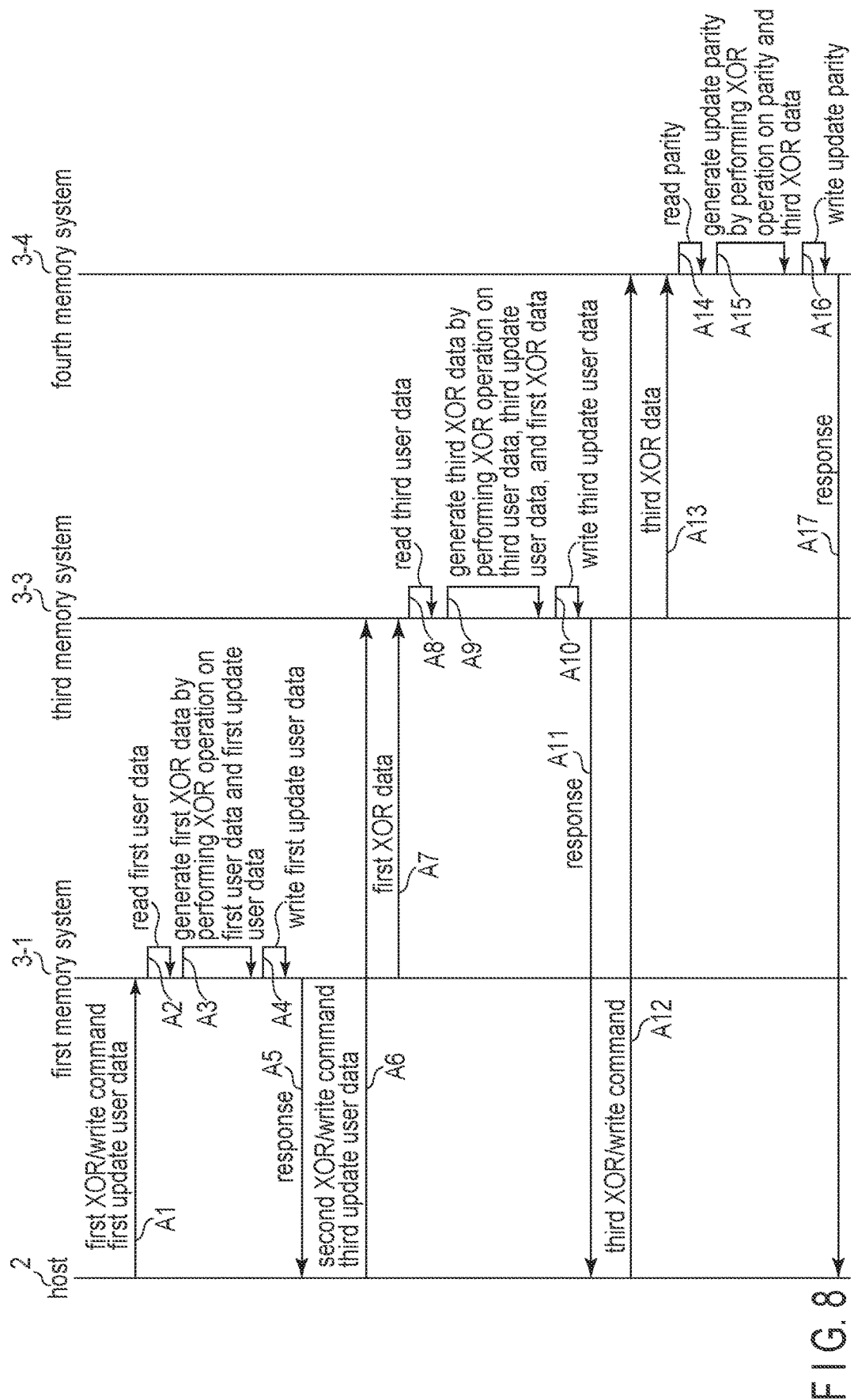
FIG. 8 is a sequence diagram illustrating a specific example of the fourth update operation in the information processing system according to the first embodiment.

FIG. 8 is a sequence diagram illustrating a specific example of the fourth update operation in the information processing system 1.

First, the host 2 transmits the first XOR/write command and the first update user data 511-U to the first memory system 3-1 (A1). The host 2 may transmit the first update user data 511-U to the first memory system 3-1 that has received the first XOR/write command.

In response to receiving the first XOR/write command and the first update user data 511-U, the first memory system 3-1 reads the first user data 511 from the NAND flash memory 5 of the first memory system 3-1 (A2). The first memory system 3-1 performs an XOR operation on the first user data 511 and the first update user data 511-U, thereby generating the first XOR data 521 (A3). The first memory system 3-1 writes the first update user data 511-U into the NAND flash memory 5 of the first memory system 3-1, and invalidates the first user data 511 (A4).

Specifically, the first memory system 3-1 updates the logical-to-physical address conversion table 31 so as to associate the logical address corresponding to the first user data 511 with the physical memory location in which the first update user data 511-U is stored, instead of the physical memory location in which the first user data 511 is stored. As a result, the first user data 511 is invalidated.

Then, the first memory system 3-1 transmits a response to the first XOR/write command to the host 2 (A5). Note that the first memory system 3-1 may transmit the response to the first XOR/write command to the host 2 not only when the first update user data 511-U has been written in the NAND flash memory 5 but also when it is guaranteed that the first update user data 511-U is made non-volatile. Specifically, for example, in a case where the first memory system 3-1 has a power loss protection (PLP) function, the first memory system 3-1 may transmit the response to the host 2 in response to generating the first XOR data 521 and storing the first update user data 511-U in a write buffer (for example, the DRAM 6). As a result, the first memory system 3-1 can transmit the response to the host 2 earlier than a case of transmitting the response in response to writing the first update user data 511-U into the NAND flash memory 5. The PLP function is a function for writing, into the NAND flash memory 5, user data or the like that is stored in the write buffer and has not yet been written into the NAND flash memory 5 by using energy of charges stored in a power storage device of the memory system 3 when power supply from an external power supply to the memory system 3 is lost.

Next, in response to receiving the response to the first XOR/write command, the host 2 transmits the second XOR/write command and the third update user data 513-U to the third memory system 3-3 (A6).

In response to receiving the second XOR/write command and the third update user data 513-U, the third memory system 3-3 receives the first XOR data 521 from the first memory system 3-1 (A7). Specifically, the third memory system 3-3 receives, for example, the first XOR data 521 that has been read and transmitted from a specific storage area (for example, the internal buffer 61-1) in the first memory system 3-1. The location in the first memory system 3-1 where the first XOR data 521 is stored is defined in advance, for example. The third memory system 3-3 reads the third user data 513 from the NAND flash memory 5 of the third memory system 3-3 (A8). The third memory system 3-3 performs an XOR operation on the third user data 513, the third update user data 513-U, and the first XOR data 521, thereby generating the third XOR data 523 (A9). The third memory system 3-3 writes the third update user data 513-U into the NAND flash memory 5 of the third memory system 3-3, and invalidates the third user data 513 (A10). Then, the third memory system 3-3 transmits a response to the second XOR/write command to the host 2 (A11). Note that the third memory system 3-3 may transmit the response to the second XOR/write command to the host 2 when it is guaranteed that the third update user data 513-U is made non-volatile.

In response to receiving the response to the second XOR/write command, the host 2 transmits the third XOR/write command to the fourth memory system 3-4 (A12).

In response to receiving the third XOR/write command, the fourth memory system 3-4 receives the third XOR data 523 from the third memory system 3-3 (A13). The fourth memory system 3-4 reads the parity 51P from the NAND flash memory 5 of the fourth memory system 3-4 (A14). The fourth memory system 3-4 performs an XOR operation on the parity 51P and the third XOR data 523, thereby generating the update parity 51P-U (A15). The fourth memory system 3-4 writes the update parity 51P-U into the NAND flash memory 5 of the fourth memory system 3-4 (A16). Then, the fourth memory system 3-4 transmits a response to the third XOR/write command to the host 2 (A17). Note that the fourth memory system 3-4 may transmit the response to the third XOR/write command to the host 2 when it is guaranteed that the update parity 51P-U is made non-volatile.

By the fourth update operation described above, in the information processing system 1, the offloading of the update operation from the host 2 to the memory systems 3 can be realized, and it is possible to prevent the congestion of data transfer to the fourth memory system 3-4 storing the parity 51P.

Note that the operation in each of the first memory system 3-1, the second memory system 3-2, the third memory system 3-3, and the fourth memory system 3-4 is realized by, for example, the CPU 14 that functions as the command reception module 141, the read processing module 142, the XOR processing module 143, and the write processing module 144 described above with reference to FIG. 2.

As an example, an operation in the first memory system 3-1 in a case where the fourth update operation is performed will be described.

FIG. 9 illustrates an example of a specific operation in the first memory system 3-1 in a case where the fourth update operation is performed.

The command reception module 141 receives the first XOR/write command from the host 2 ((1) in FIG. 9). In response to receiving the first XOR/write command, the command reception module 141 receives the first update user data 511-U from the host 2 ((2) in FIG. 9). On the basis of the first XOR/write command, the command reception module 141 sends a read instruction to read the first user data 511 to the read processing module 142 ((3) in FIG. 9).

In response to the read instruction, the read processing module 142 reads the first user data 511 from the NAND flash memory 5 ((4) in FIG. 9). Then, the read processing module 142 sends the read first user data 511 to the XOR processing module 143 ((5) in FIG. 9).

Next, the command reception module 141 sends, to the XOR processing module 143, the first update user data 511-U, and an XOR instruction to perform an XOR operation on the first user data 511 and the first update user data 511-U ((6) in FIG. 9).

In response to the XOR instruction, the XOR processing module 143 performs an XOR operation on the first user data 511 and the first update user data 511-U, thereby generating the first XOR data 521. The XOR processing module 143 stores the generated first XOR data 521 in the internal buffer 61-1 ((7) in FIG. 9).

Then, the command reception module 141 sends, to the write processing module 144, the first update user data 511-U and a write instruction to write the first update user data 511-U ((8) in FIG. 9).

In response to the write instruction, the write processing module 144 writes the first update user data 511-U into the NAND flash memory 5 ((9) in FIG. 9). Then, the write processing module 144 updates the logical-to-physical address conversion table 31 such that a logical address, which is associated with the physical memory location where the first user data 511 is stored, is associated with the physical memory location where the first update user data 511-U is stored ((10) in FIG. 9). As a result, the first user data 511 is invalidated, and user data corresponding to the logical address is updated to the first update user data 511-U.

Then, the command reception module 141 transmits a response to the first XOR/write command to the host 2 ((11) in FIG. 9).

Similarly, the operation in each of the second memory system 3-2, the third memory system 3-3, and the fourth memory system 3-4 may be realized by the CPU 14 that functions as the command reception module 141, the read processing module 142, the XOR processing module 143, and the write processing module 144.

Figure 10:
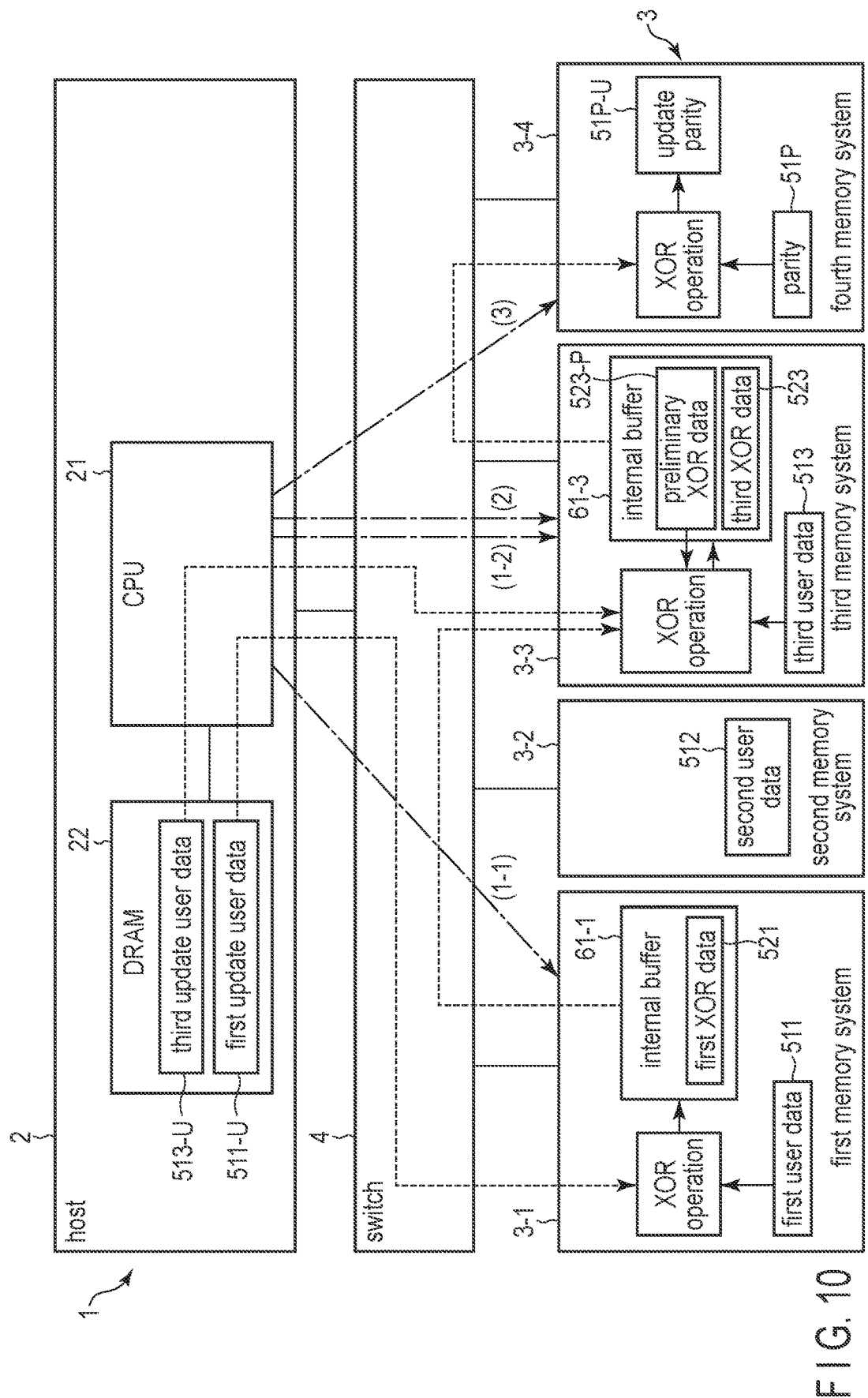
FIG. 10 is a diagram illustrating an example of a fifth update operation in the information processing system according to the first embodiment.

FIG. 10 illustrates an example of a fifth update operation in the information processing system 1. Similarly to the fourth update operation, the fifth update operation is executed for updating the first user data 511 stored in the first memory system 3-1 with the first update user data 511-U and updating the third user data 513 stored in the third memory system 3-3 with the third update user data 513-U.

The DRAM 22 of the host 2 stores the first update user data 511-U and the third update user data 513-U.

The CPU 21 of the host 2 transmits the first XOR/write command for requesting an XOR operation and the writing of the first update user data 511-U, to the first memory system 3-1 ((1-1) in FIG. 10). In addition, the CPU 21 of the host 2 transmits a second XOR/write command for requesting an XOR operation and the writing of the third update user data 513-U, to the third memory system 3-3 ((1-2) in FIG. 10).

In response to receiving the first XOR/write command from the host 2, the first memory system 3-1 receives the first update user data 511-U from the host 2. The first memory system 3-1 reads the first user data 511 from the NAND flash memory 5 of the first memory system 3-1. The first memory system 3-1 performs an XOR operation on the first user data 511 and the first update user data 511-U, thereby generating the first XOR data 521. The first XOR data 521 is stored in the internal buffer 61-1 of the first memory system 3-1. Then, the first memory system 3-1 writes the first update user data 511-U into the NAND flash memory 5 of the first memory system 3-1.

In response to receiving the second XOR/write command from the host 2, the third memory system 3-3 receives the third update user data 513-U from the host 2. The third memory system 3-3 reads the third user data 513 from the NAND flash memory 5 of the third memory system 3-3. The third memory system 3-3 performs an XOR operation on the third user data 513 and the third update user data 513-U, thereby generating preliminary XOR data 523-P. The preliminary XOR data 523-P is stored in the internal buffer 61-3 of the third memory system 3-3. Then, the third memory system 3-3 writes the third update user data 513-U into the NAND flash memory 5 of the third memory system 3-3. The operation by the third memory system 3-3 according to the second XOR/write command is performed, for example, in parallel with the operation by the first memory system 3-1 according to the first XOR/write command.

Next, the CPU 21 of the host 2 transmits an XOR command for requesting an XOR operation on the first XOR data 521 and the preliminary XOR data 523-P to the third memory system 3-3 ((2) in FIG. 10).

In response to receiving the XOR command from the host 2, the third memory system 3-3 receives the first XOR data 521 from the first memory system 3-1. The third memory system 3-3 performs an XOR operation on the first XOR data 521 and the preliminary XOR data 523-P, thereby generating the third XOR data 523. The third XOR data 523 is stored in the internal buffer 61-3 of the third memory system 3-3.

Next, the CPU 21 of the host 2 transmits a third XOR/write command for requesting an XOR operation and the writing of the update parity 51P-U, to the fourth memory system 3-4 ((3) in FIG. 10).

In response to receiving the third XOR/write command from the host 2, the fourth memory system 3-4 receives the third XOR data 523 from the third memory system 3-3. The fourth memory system 3-4 reads the parity 51P from the NAND flash memory 5 of the fourth memory system 3-4. The fourth memory system 3-4 performs an XOR operation on the third XOR data 523 and the parity 51P, thereby generating the update parity 51P-U. Then, the fourth memory system 3-4 writes the update parity 51P-U into the NAND flash memory 5 of the fourth memory system 3-4.

By the fifth update operation described above, in the information processing system 1, the first user data 511 stored in the first memory system 3-1 is updated with the first update user data 511-U, the third user data 513 stored in the third memory system 3-3 is updated with the third update user data 513-U, and the parity 51P stored in the fourth memory system 3-4 is updated with the update parity 51P-U.

In the fifth update operation, the update parity 51P-U is generated by using the resources of the memory systems 3. Therefore, in the fifth update operation, the offloading of the update operation from the host 2 to the memory systems 3 can be realized.

In addition, in the fifth update operation, the first XOR data 521 is transmitted from the first memory system 3-1 to the third memory system 3-3, and the third XOR data 523 is transmitted from the third memory system 3-3 to the fourth memory system 3-4. As a result, it is possible to prevent the congestion of data transfer to the fourth memory system 3-4 storing the parity 51P.

Further, in the fifth update operation, the operation by the first memory system 3-1 according to the first XOR/write command and the operation by the third memory system 3-3 according to the second XOR/write command are performed in parallel. As a result, the operation by the first memory system 3-1 and the operation by the third memory system 3-3 can be partially parallelized. Therefore, in the information processing system 1, the time required for the fifth update operation may be shorter than the time required for the fourth update operation.

As described above, in the information processing system 1 that performs the fifth update operation, performance of the whole of the information processing system 1 can be improved while reducing the load on the host 2.

FIG. 11 is a sequence diagram illustrating a specific example of the fifth update operation in the information processing system 1.

First, the host 2 transmits the first XOR/write command and the first update user data 511-U to the first memory system 3-1 (B1). The host 2 may transmit the first update user data 511-U to the first memory system 3-1 that has received the first XOR/write command. In addition, the host 2 transmits the second XOR/write command and the third update user data 513-U to the third memory system 3-3 (B2). The host 2 may transmit the third update user data 513-U to the third memory system 3-3 that has received the second XOR/write command.

In response to receiving the first XOR/write command and the first update user data 511-U, the first memory system 3-1 reads the first user data 511 from the NAND flash memory 5 of the first memory system 3-1 (B3). The first memory system 3-1 performs an XOR operation on the first user data 511 and the first update user data 511-U, thereby generating the first XOR data 521, and stores the first XOR data 521 in the internal buffer 61-1 (B4). The first memory system 3-1 writes the first update user data 511-U into the NAND flash memory 5 of the first memory system 3-1, and invalidates the first user data 511 (B5). Then, the first memory system 3-1 transmits a response to the first XOR/write command to the host 2 (B6).

In response to receiving the second XOR/write command and the third update user data 513-U, the third memory system 3-3 reads the third user data 513 from the NAND flash memory 5 of the third memory system 3-3 (B7). The third memory system 3-3 performs an XOR operation on the third user data 513 and the third update user data 513-U, thereby generating the preliminary XOR data 523-P, and stores the generated preliminary XOR data 523-P in the internal buffer 61-3 (B8). The third memory system 3-3 writes the third update user data 513-U into the NAND flash memory 5 of the third memory system 3-3, and invalidates the third user data 513 (B9). Then, the third memory system 3-3 transmits a response to the second XOR/write command to the host 2 (B10).

Next, in response to receiving the response to the first XOR/write command and the response to the second XOR/write command, the host 2 transmits an XOR command to the third memory system 3-3 (B11).

In response to receiving the XOR command, the third memory system 3-3 receives the first XOR data 521 from the first memory system 3-1 (B12). The third memory system 3-3 performs an XOR operation on the first XOR data 521 and the preliminary XOR data 523-P, thereby generating the third XOR data 523, and stores the third XOR data 523 in the internal buffer 61-3 (B13). Then, the third memory system 3-3 transmits a response to the XOR command to the host 2 (B14). The subsequent operation from B15 to B20 is similar to the operation from A12 to A17 in the fourth update operation described above with reference to FIG. 8.

By the fifth update operation described above, in the information processing system 1, the offloading of the update operation from the host 2 to the memory systems 3 can be realized, and it is possible to prevent the congestion of data transfer to the fourth memory system 3-4 storing the parity 51P. In addition, by at least partially parallelizing the operation in the first memory system 3-1 and the operation in the third memory system 3-3, the time required for the fifth update operation may be made shorter than the time required for the fourth update operation.

Second Embodiment

In the information processing system 1 according to the first embodiment, in a case where the multiple memory systems 3 are configured as RAID, an update operation is performed such that at least a part of the user data 51D included in one ECC frame 51E is updated across two or more memory systems 3. In contrast, in an information processing system 1 according to a second embodiment, in a case where multiple memory systems 3 are configured as RAID, an operation (rebuild operation) of restoring data stored in a failed memory system 3 and reconstructing the RAID is performed.

A configuration of the information processing system 1 according to the second embodiment is similar to that of the information processing system 1 according to the first embodiment. The second embodiment is different in that the rebuild operation is performed in the host 2 and the memory systems 3. Hereinafter, the differences from the first embodiment will be mainly described.

Figure 12:
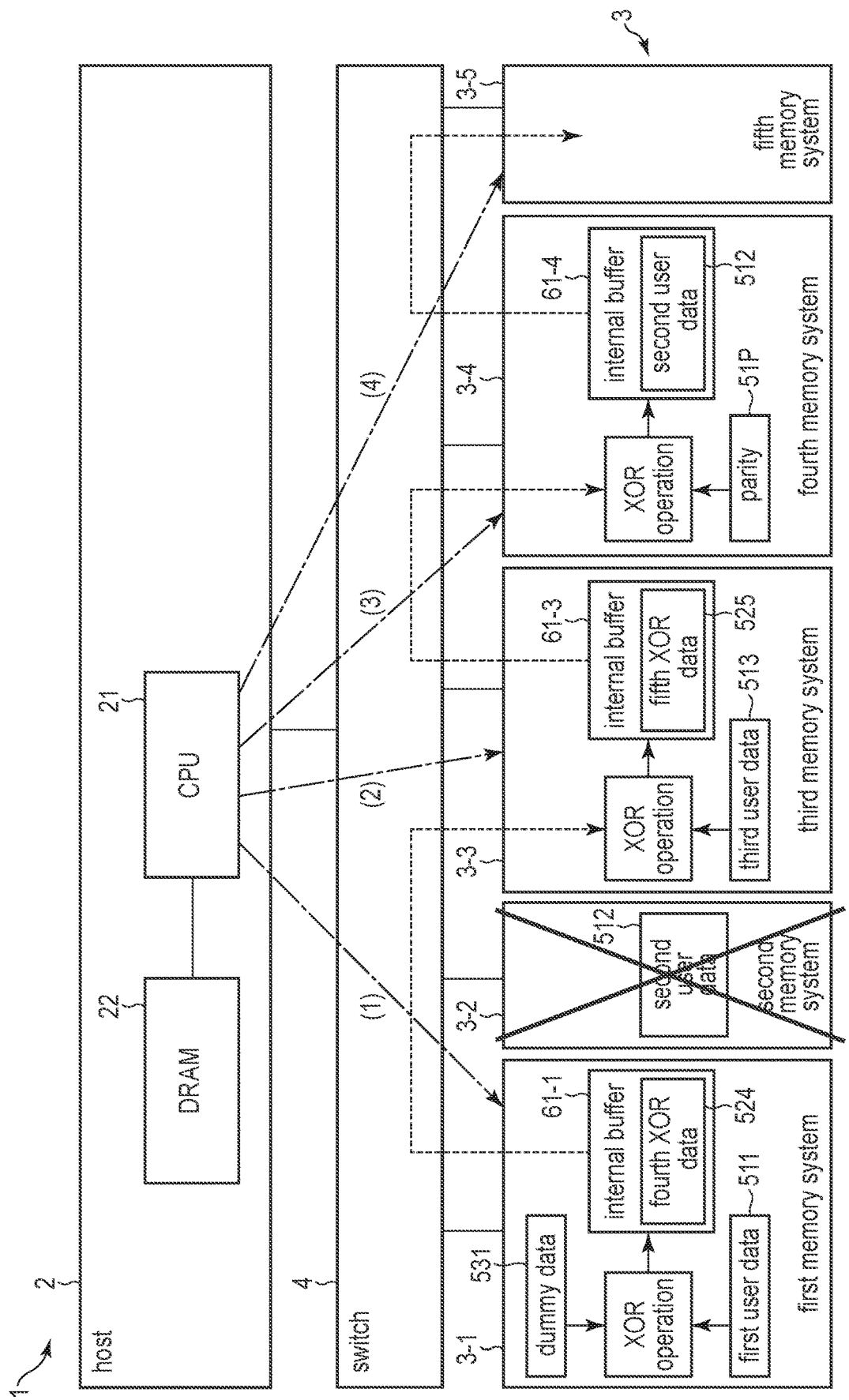
FIG. 12 is a diagram illustrating an example of a first rebuild operation in an information processing system according to a second embodiment.

FIG. 12 illustrates an example of a first rebuild operation in the information processing system 1. The first rebuild operation is an operation of restoring data stored in a failed memory system 3 and reconstructing the RAID while reducing resources of the host 2 being used. Here, a case where the second memory system 3-2 fails will be explained. A fifth memory system 3-5 is a memory system 3 to be replaced from the failed second memory system 3-2. In other words, in the information processing system 1, in order to cope with the failure of the second memory system 3-2, the rebuild operation is performed such that the RAID is reconstructed by the first memory system 3-1, the third memory system 3-3, the fourth memory system 3-4, and the fifth memory system 3-5.

It is assumed that the first user data 511, the second user data 512, the third user data 513, and the parity 51P are stored respectively in the four memory systems 3-1, 3-2, 3-3, and 3-4 by the sequential write operation described above with reference to FIG. 3. The first user data 511, the second user data 512, the third user data 513, and the parity 51P constitute one ECC frame 51E.

When the second memory system 3-2 fails, the host 2 transmits an XOR command (first XOR command) for requesting an XOR operation to the first memory system 3-1 ((1) in FIG. 12). The first XOR command may include a logical address of the first user data 511.

In response to the first XOR command from the host 2, the first memory system 3-1 reads the first user data 511 from the NAND flash memory 5 of the first memory system 3-1. The first memory system 3-1 performs an XOR operation on the first user data 511 and dummy data 531, thereby generating fourth XOR data 524. The fourth XOR data 524 is stored in the internal buffer 61-1, for example. The dummy data 531 is a data string in which all bits are zero. The dummy data 531 and the first user data 511 have the same data length. Since all bits of the data string of the dummy data 531 are zero, the fourth XOR data 524 is the same as the first user data 511. The first memory system 3-1 may store the first user data 511 as it is in the internal buffer 61-1 instead of performing the XOR operation on the first user data 511 and the dummy data 531.

Then, the host 2 transmits a second XOR command to the third memory system 3-3 ((2) in FIG. 12). The second XOR command may include a logical address of the third user data 513 and an identifier (for example, an address) of the internal buffer 61-1 of the first memory system 3-1 (more specifically, the storage location of the fourth XOR data 524).

In response to the second XOR command from the host 2, the third memory system 3-3 receives the fourth XOR data 524 from the first memory system 3-1. The third memory system 3-3 reads the third user data 513 from the NAND flash memory 5 of the third memory system 3-3. The third memory system 3-3 performs an XOR operation on the third user data 513 and the fourth XOR data 524, thereby generating fifth XOR data 525. The fifth XOR data 525 is stored in the internal buffer 61-3, for example.

Next, the host 2 transmits a third XOR command to the fourth memory system 3-4 ((3) in FIG. 12). The third XOR command may include a logical address of the parity 51P and an identifier (for example, an address) of the internal buffer 61-3 of the third memory system 3-3 (more specifically, the storage location of the fifth XOR data 525).

In response to the third XOR command from the host 2, the fourth memory system 3-4 receives the fifth XOR data 525 from the third memory system 3-3. The fourth memory system 3-4 reads the parity 51P from the NAND flash memory 5 of the fourth memory system 3-4. The fourth memory system 3-4 performs an XOR operation on the parity 51P and the fifth XOR data 525, thereby generating the second user data 512. That is, the second user data 512 stored in the NAND flash memory 5 of the failed second memory system 3-2 is restored. The generated second user data 512 is stored in an internal buffer 61-4 of the fourth memory system 3-4, for example.

Then, the host 2 transmits a write command for requesting the writing of the second user data 512, to the fifth memory system 3-5 ((4) in FIG. 12). The write command may include a logical address of the second user data 512 and an identifier (for example, an address) of the internal buffer 61-4 of the fourth memory system 3-4 (more specifically, the storage location of the second user data 512).

In response to receiving the write command from the host 2, the fifth memory system 3-5 receives the second user data 512 from the fourth memory system 3-4. Then, the fifth memory system 3-5 writes the second user data 512 into the NAND flash memory 5 of the fifth memory system 3-5.

By the first rebuild operation described above, in the information processing system 1, the second user data 512 stored in the failed second memory system 3-2 can be restored and stored in the fifth memory system 3-5 that is replaced from the second memory system 3-2. Then, by similarly repeating the first rebuild operation, it is possible to restore all data (that is, user data and parities) stored in the second memory system 3-2 and store the restored data in the fifth memory system 3-5. As a result, in the information processing system 1, the RAID can be reconstructed by the first memory system 3-1, the third memory system 3-3, the fourth memory system 3-4, and the fifth memory system 3-5.

In the first rebuild operation, the second user data 512 is restored by using the resources of the memory systems 3. Therefore, in the first rebuild operation, the offloading of the rebuild operation from the host 2 to the memory systems 3 can be realized.

Note that as another operation for restoring the second user data 512, for example, an operation can be considered in which one of the first memory system 3-1, the third memory system 3-3, the fourth memory system 3-4, and the fifth memory system 3-5 acquires the first user data 511, the third user data 513, and the parity 51P, and performs an XOR operation to restore the second user data 512. However, in this operation, data transfer to one memory system 3 that restores the second user data 512 is congested.

In contrast, in the first rebuild operation, the fourth XOR data 524 is transmitted from the first memory system 3-1 to the third memory system 3-3, the fifth XOR data 525 is transmitted from the third memory system 3-3 to the fourth memory system 3-4, and the second user data 512 is transmitted from the fourth memory system 3-4 to the fifth memory system 3-5. As a result, it is possible to prevent the congestion of data transfer to a specific one of the first memory system 3-1, the third memory system 3-3, the fourth memory system 3-4, and the fifth memory system 3-5.

Therefore, in the information processing system 1 that performs the first rebuild operation, performance of the whole of the information processing system 1 can be improved while reducing the load on the host 2.

FIG. 13 is a sequence diagram illustrating a specific example of the first rebuild operation in the information processing system 1.

First, the host 2 transmits the first XOR command to the first memory system 3-1 (C1).

In response to receiving the first XOR command, the first memory system 3-1 reads the first user data 511 from the NAND flash memory 5 of the first memory system 3-1 (C2). The first memory system 3-1 performs an XOR operation on the first user data 511 and the dummy data 531, thereby generating the fourth XOR data 524 (=the first user data 511), and stores the fourth XOR data 524 in the internal buffer 61-1 (C3). Then, the first memory system 3-1 transmits a response to the first XOR command to the host 2 (C4).

In response to receiving the response to the first XOR command, the host 2 transmits the second XOR command to the third memory system 3-3 (C5).

In response to receiving the second XOR command, the third memory system 3-3 receives the fourth XOR data 524 from the first memory system 3-1 (C6). The third memory system 3-3 reads the third user data 513 from the NAND flash memory 5 of the third memory system 3-3 (C7). The third memory system 3-3 performs an XOR operation on the third user data 513 and the fourth XOR data 524, thereby generating the fifth XOR data 525, and stores the fifth XOR data 525 in the internal buffer 61-3 (C8). Then, the third memory system 3-3 transmits a response to the second XOR command to the host 2 (C9).

In response to receiving the response to the second XOR command, the host 2 transmits the third XOR command to the fourth memory system 3-4 (C10).

In response to receiving the third XOR command, the fourth memory system 3-4 receives the fifth XOR data 525 from the third memory system 3-3 (C11). The fourth memory system 3-4 reads the parity 51P from the NAND flash memory 5 of the fourth memory system 3-4 (C12). The fourth memory system 3-4 performs an XOR operation on the parity 51P and the fifth XOR data 525, thereby generating the second user data 512, and stores the second user data 512 in the internal buffer 61-4 (C13). Then, the fourth memory system 3-4 transmits a response to the third XOR command to the host 2 (C14).

In response to receiving the response to the third XOR command, the host 2 transmits the write command to the fifth memory system 3-5 (C15).

In response to receiving the write command, the fifth memory system 3-5 receives the second user data 512 from the fourth memory system 3-4 (C16). The fifth memory system 3-5 writes the second user data 512 into the NAND flash memory 5 of the fifth memory system 3-5 (C17). Then, the fifth memory system 3-5 transmits a response to the write command to the host 2 (C18).

By the first rebuild operation described above, in the information processing system 1, the offloading of the rebuild operation from the host 2 to the memory systems 3 can be realized, and it is possible to prevent the congestion of data transfer to a specific memory system 3.

FIG. 14 illustrates an example of a second rebuild operation in the information processing system 1. Similarly to the first rebuild operation, the second rebuild operation is an operation for reconstructing the RAID by the first memory system 3-1, the third memory system 3-3, the fourth memory system 3-4, and the fifth memory system 3-5 in order to cope with a failure of the second memory system 3-2.

When the second memory system 3-2 fails, the host 2 transmits a first XOR command to the first memory system 3-1 ((1) in FIG. 14). The first XOR command may further include an identifier of the third memory system 3-3.

In response to the first XOR command from the host 2, the first memory system 3-1 reads the first user data 511 from the NAND flash memory 5 of the first memory system 3-1. The first memory system 3-1 performs an XOR operation on the first user data 511 and the dummy data 531, thereby generating the fourth XOR data 524. The fourth XOR data 524 is stored in the internal buffer 61-1, for example. Then, the first memory system 3-1 transmits a second XOR command to the third memory system 3-3 ((2) in FIG. 14). The second XOR command may further include an identifier of the fourth memory system 3-4.

In response to the second XOR command from the first memory system 3-1, the third memory system 3-3 receives the fourth XOR data 524 from the first memory system 3-1. The third memory system 3-3 reads the third user data 513 from the NAND flash memory 5 of the third memory system 3-3. The third memory system 3-3 performs an XOR operation on the third user data 513 and the fourth XOR data 524, thereby generating the fifth XOR data 525. The fifth XOR data 525 is stored in the internal buffer 61-3, for example. Then, the third memory system 3-3 transmits a third XOR command to the fourth memory system 3-4 ((3) in FIG. 14). The third XOR command may further include an identifier of the fifth memory system 3-5.

In response to the third XOR command from the third memory system 3-3, the fourth memory system 3-4 receives the fifth XOR data 525 from the third memory system 3-3. The fourth memory system 3-4 reads the parity 51P from the NAND flash memory 5 of the fourth memory system 3-4. The fourth memory system 3-4 performs an XOR operation on the parity 51P and the fifth XOR data 525, thereby generating the second user data 512. That is, the second user data 512 stored in the NAND flash memory 5 of the failed second memory system 3-2 is restored. The generated second user data 512 is stored in the internal buffer 61-4, for example. Then, the fourth memory system 3-4 transmits a write command for requesting the writing of the second user data 512, to the fifth memory system 3-5 ((4) in FIG. 14).

In response to the write command from the fourth memory system 3-4, the fifth memory system 3-5 receives the second user data 512 from the fourth memory system 3-4. Then, the fifth memory system 3-5 writes the second user data 512 into the NAND flash memory 5 of the fifth memory system 3-5.

By the second rebuild operation described above, in the information processing system 1, the second user data 512 stored in the failed second memory system 3-2 can be restored and stored in the fifth memory system 3-5 that is replaced from the second memory system 3-2. Then, by similarly repeating the second rebuild operation, all data stored in the second memory system 3-2 can be restored, and the restored data can be stored in the fifth memory system 3-5. As a result, in the information processing system 1, the RAID can be reconstructed by the first memory system 3-1, the third memory system 3-3, the fourth memory system 3-4, and the fifth memory system 3-5.

In addition, in the second rebuild operation, the second user data 512 is restored by using the resources of the memory systems 3. Further, not only data (that is, the fourth XOR data 524, the fifth XOR data 525, and the second user data 512) but also commands are transferred between the memory systems 3. Accordingly, in the second rebuild operation, the host 2 needs to transmit only the first XOR command to the first memory system 3-1. Therefore, in the second rebuild operation, the offloading of the rebuild operation from the host 2 to the memory systems 3 can be realized.

Further, in the second rebuild operation, the fourth XOR data 524 is transmitted from the first memory system 3-1 to the third memory system 3-3, the fifth XOR data 525 is transmitted from the third memory system 3-3 to the fourth memory system 3-4, and the second user data 512 is transmitted from the fourth memory system 3-4 to the fifth memory system 3-5. As a result, it is possible to prevent the congestion of data transfer to a specific one of the first memory system 3-1, the third memory system 3-3, the fourth memory system 3-4, and the fifth memory system 3-5.

Therefore, in the information processing system 1 that performs the second rebuild operation, performance of the whole of the information processing system 1 can be improved while reducing the load on the host 2.

Figure 15:
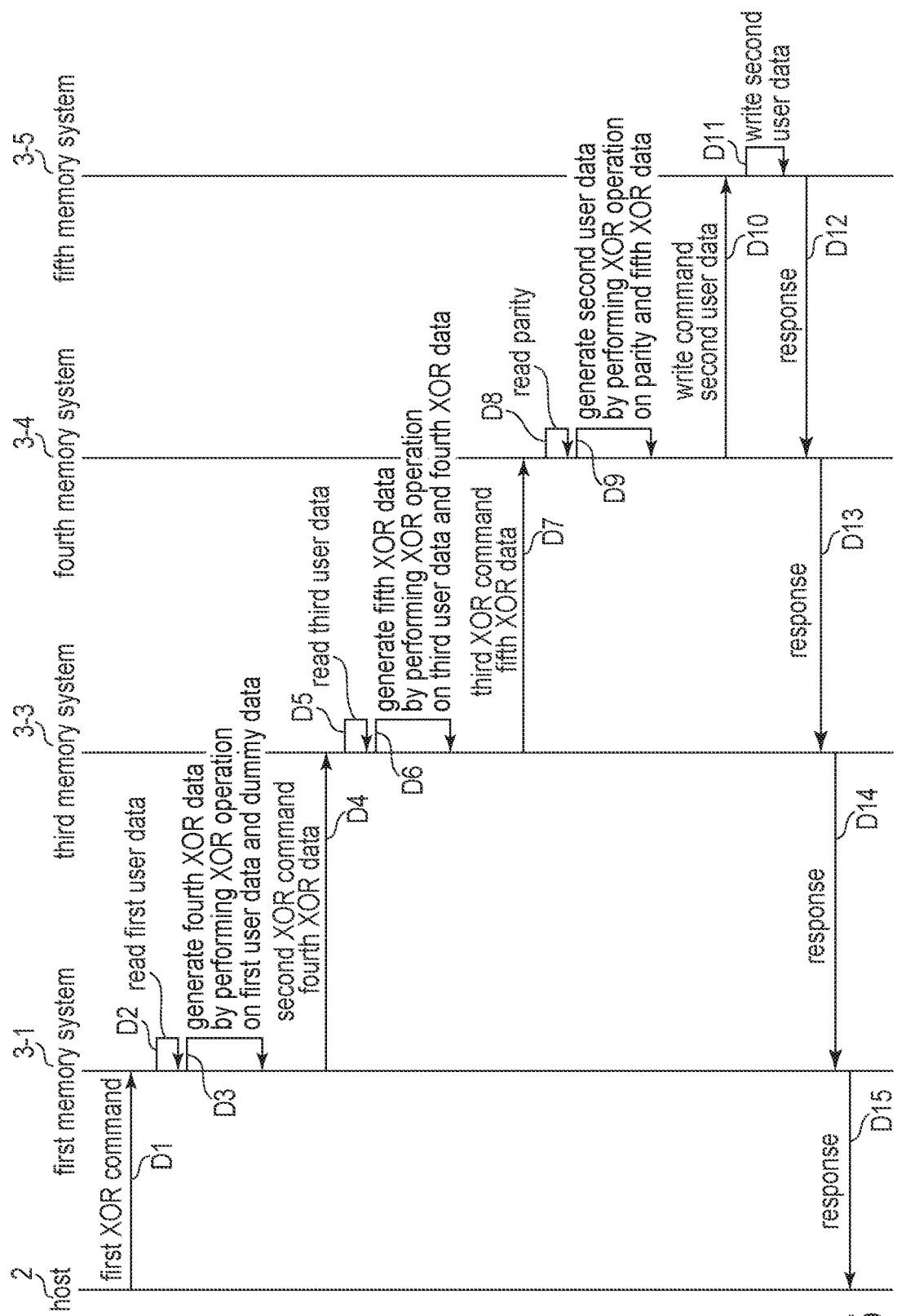
FIG. 15 is a sequence diagram illustrating a specific example of the second rebuild operation in the information processing system according to the second embodiment.

FIG. 15 is a sequence diagram illustrating a specific example of the second rebuild operation in the information processing system 1.

First, the host 2 transmits the first XOR command to the first memory system 3-1 (D1).

In response to receiving the first XOR command, the first memory system 3-1 reads the first user data 511 from the NAND flash memory 5 of the first memory system 3-1 (D2). The first memory system 3-1 performs an XOR operation on the first user data 511 and the dummy data 531, thereby generating the fourth XOR data 524, and stores the fourth XOR data 524 in the internal buffer 61-1 (D3). Then, the first memory system 3-1 transmits the second XOR command and the fourth XOR data 524 to the third memory system 3-3 (D4).

In response to receiving the second XOR command and the fourth XOR data 524, the third memory system 3-3 reads the third user data 513 from the NAND flash memory 5 of the third memory system 3-3 (D5). The third memory system 3-3 performs an XOR operation on the third user data 513 and the fourth XOR data 524, thereby generating the fifth XOR data 525, and stores the fifth XOR data 525 in the internal buffer 61-3 (D6). Then, the third memory system 3-3 transmits the third XOR command and the fifth XOR data 525 to the fourth memory system 3-4 (D7).

In response to receiving the third XOR command and the fifth XOR data 525, the fourth memory system 3-4 reads the parity 51P from the NAND flash memory 5 of the fourth memory system 3-4 (D8). The fourth memory system 3-4 performs an XOR operation on the parity 51P and the fifth XOR data 525, thereby generating the second user data 512, and stores the second user data 512 in the internal buffer 61-4 (D9). Then, the fourth memory system 3-4 transmits the write command and the second user data 512 to the fifth memory system 3-5 (D10).

In response to receiving the write command and the second user data 512, the fifth memory system 3-5 writes the second user data 512 into the NAND flash memory 5 of the fifth memory system 3-5 (D11). Then, the fifth memory system 3-5 transmits a response to the write command to the fourth memory system 3-4 (D12).

In response to receiving the response to the write command, the fourth memory system 3-4 transmits a response to the third XOR command to the third memory system 3-3 (D13). In response to receiving the response to the third XOR command, the third memory system 3-3 transmits a response to the second XOR command to the first memory system 3-1 (D14). In response to receiving the response to the second XOR command, the first memory system 3-1 transmits a response to the first XOR command to the host 2 (D15).

By the second rebuild operation described above, in the information processing system 1, the offloading of the rebuild operation from the host 2 to the memory systems 3 can be realized, and it is possible to prevent the congestion of data transfer to a specific memory system 3.

Note that the operation in each of the first memory system 3-1, the third memory system 3-3, the fourth memory system 3-4, and the fifth memory system 3-5 is realized by, for example, the CPU 14 that functions as the command reception module 141, the read processing module 142, the XOR processing module 143, and the write processing module 144 described above with reference to FIG. 2.

As an example, an operation in the first memory system 3-1 in a case where the second rebuild operation is performed will be described.

Figure 16:
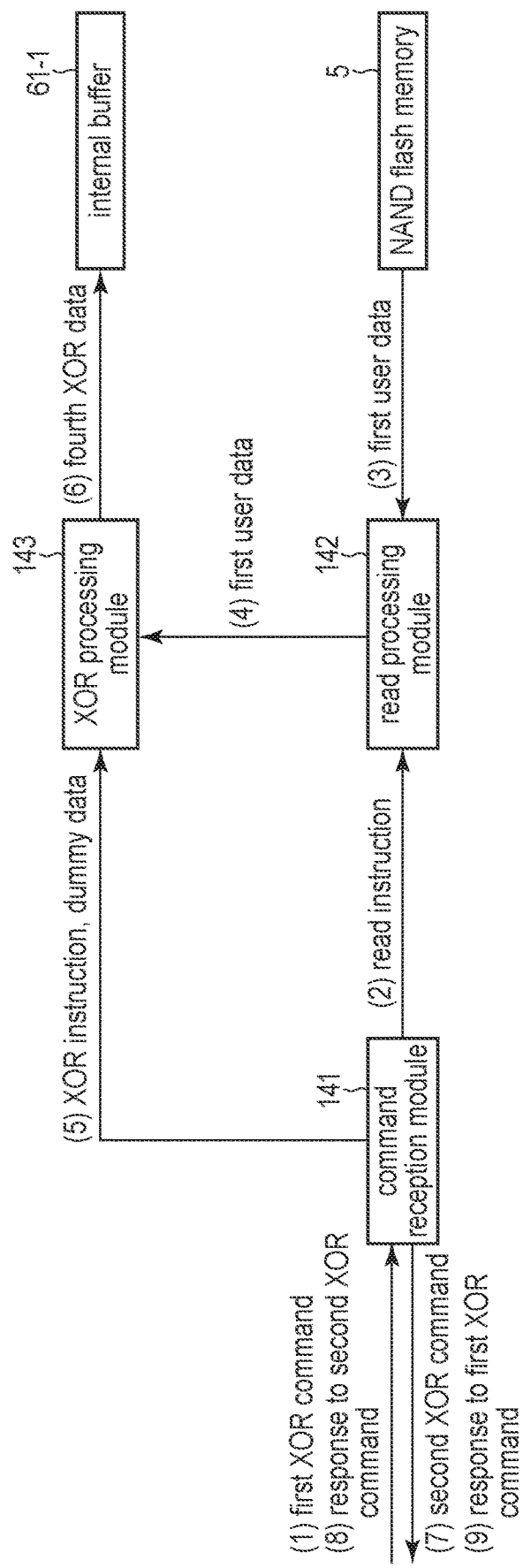
FIG. 16 is a diagram illustrating a specific example of an operation in a first memory system of the information processing system according to the second embodiment.

FIG. 16 illustrates an example of a specific operation in the first memory system 3-1 in a case where the second rebuild operation is performed.

The command reception module 141 receives the first XOR command from the host 2 ((1) in FIG. 16). On the basis of the first XOR command, the command reception module 141 sends a read instruction to read the first user data 511 to the read processing module 142 ((2) in FIG. 16).

In response to the read instruction, the read processing module 142 reads the first user data 511 from the NAND flash memory 5 ((3) in FIG. 16). Then, the read processing module 142 sends the read first user data 511 to the XOR processing module 143 ((4) in FIG. 16).

Next, the command reception module 141 sends, to the XOR processing module 143, the dummy data 531 and an XOR instruction to perform an XOR operation on the first user data 511 and the dummy data 531 ((5) in FIG. 16).

In response to the XOR instruction, the XOR processing module 143 performs an XOR operation on the first user data 511 and the dummy data 531, thereby generating the fourth XOR data 524. The XOR processing module 143 stores the generated fourth XOR data 524 in the internal buffer 61-1 ((6) in FIG. 16).

Next, the command reception module 141 transmits the second XOR command to the third memory system 3-3 ((7) in FIG. 16). Thereafter, the command reception module 141 receives a response to the second XOR command from the third memory system 3-3 ((8) in FIG. 16). In response to receiving the response to the second XOR command, the command reception module 141 transmits a response to the first XOR command to the host 2 ((9) in FIG. 16).

Similarly, the operation in each of the third memory system 3-3, the fourth memory system 3-4, and the fifth memory system 3-5 may be realized by the CPU 14 that functions as the command reception module 141, the read processing module 142, the XOR processing module 143, and the write processing module 144.

As described above, according to the first and second embodiments, it is possible to improve the whole performance while reducing the load on the host 2.

In the information processing system 1 according to the first embodiment, the controller 7 of the first memory system 3-1 stores the first user data 511 in the NAND flash memory 5 of the first memory system 3-1. The controller 7 of the third memory system 3-3 stores the third user data 513 in the NAND flash memory 5 of the third memory system 3-3. The first user data 511 and the third user data 513 constitute at least a part of one error correction code frame 51E. In a case where the first user data 511 and the third user data 513 are updated, the host 2 transmits, to the first memory system 3-1, the first update user data 511-U updated from the first user data 511, and transmits, to the third memory system 3-3, the third update user data 513-U updated from the third user data 513. The controller 7 of the first memory system 3-1 generates the first XOR data 521 by performing an XOR operation on at least the first user data 511 and the first update user data 511-U, and transmits the first XOR data 521 to the third memory system 3-3. The controller 7 of the third memory system 3-3 generates the third XOR data 523 by performing an XOR operation on the third user data 513, the third update user data 513-U, and the first XOR data 521, and transmits the third XOR data 523 to the fourth memory system 3-4.

As a result, the offloading of the update operation from the host 2 to the memory systems 3 can be realized, and, for example, it is possible to prevent the congestion of data transfer to the fourth memory system 3-4 storing the parity 51P.

In addition, in the information processing system 1 according to the second embodiment, the controller 7 of the second memory system 3-2 stores the second user data 512 in the NAND flash memory 5 of the second memory system 3-2. The controller 7 of the third memory system 3-3 stores the third user data 513 in the NAND flash memory 5 of the third memory system 3-3. The controller 7 of the fourth memory system 3-4 stores the parity 51P in the NAND flash memory 5 of the fourth memory system 3-4. The second user data 512, the third user data 513, and the parity 51P constitute at least a part of one error correction code frame 51E. When the second memory system 3-2 fails, the controller 7 of the third memory system 3-3 generates the fifth XOR data 525 by performing an XOR operation on the fourth XOR data 524 and the third user data 513, and transmits the fifth XOR data 525 to the fourth memory system 3-4. The controller 7 of the fourth memory system 3-4 generates the second user data 512 by performing an XOR operation on the fifth XOR data 525 and the parity 51P, and transmits the generated second user data 512 to the fifth memory system 3-5 that is replaced from the failed second memory system 3-2.

As a result, in the information processing system 1, the offloading of the rebuild operation from the host 2 to the memory systems 3 can be realized, and it is possible to prevent the congestion of data transfer to a specific memory system 3.

Each of the various functions described in the first and second embodiments may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiments may be realized in a processing circuit.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. An information processing system comprising:
a host; and
a plurality of memory systems each including a controller and a nonvolatile memory, the plurality of memory systems including at least a first memory system, a second memory system, and a third memory system, wherein
the controller of the first memory system is configured to store first data in a first nonvolatile memory,
the controller of the second memory system is configured to store second data in a second nonvolatile memory,
the first data and the second data constitute at least a part of an error correction code frame,
the host is configured to, in a case where the first data and the second data are updated:
transmit, to the first memory system, a first request and first update data updated from the first data; and
in response to receiving a first response to the first request from the first memory system, transmit, to the second memory system, a second request and second update data updated from the second data,
the controller of the first memory system is further configured to, in response to receiving the first request:
generate first exclusive-logical-OR data by performing an exclusive-logical-OR operation on at least the first data and the first update data;
transmit the first response to the host; and
transmit the first exclusive-logical-OR data to the second memory system, and
the controller of the second memory system is further configured to, in response to receiving the second request:
generate second exclusive-logical-OR data by performing an exclusive-logical-OR operation on the second data, the second update data, and the first exclusive-logical-OR data;
transmit a second response to the second request to the host; and
transmit the second exclusive-logical-OR data to the third memory system.

2. The information processing system according to claim 1, wherein
the controller of the third memory system is configured to store a parity in a third nonvolatile memory, and
the first data, the second data, and the parity constitute at least a part of the error correction code frame.

3. The information processing system according to claim 1, wherein
the controller of the third memory system is configured to store a parity in a third nonvolatile memory,
the first data, the second data, and the parity constitute at least a part of the error correction code frame,
the host is further configured to transmit a third request to the third memory system in response to receiving the second response,
the controller of the third memory system is further configured to, in response to receiving the third request, generate an update parity by performing an exclusive-logical-OR operation on the parity and the second exclusive-logical-OR data, and
the first update data, the second update data, and the update parity constitute at least a part of the error correction code frame that is updated.

4. An information processing system comprising:
a host; and
a plurality of memory systems each including a controller and a nonvolatile memory, the plurality of memory systems including at least a first memory system, a second memory system, and a third memory system, wherein the controller of the first memory system is configured to store first data in a first nonvolatile memory, the controller of the second memory system is configured to store second data in a second nonvolatile memory, the controller of the third memory system is configured to store a parity in a third nonvolatile memory, the first data, the second data, and the parity constitute at least a part of an error correction code frame, the controller of the first memory system is further configured to, in a case where the second memory system fails:
 generate first exclusive-logical-OR data by performing an exclusive-logical-OR operation on third data and the first data; and
 transmit the first exclusive-logical-OR data to the third memory system, and the controller of the third memory system is further configured to, in the case where the second memory system fails:
 generate the second data by performing an exclusive-logical-OR operation on the first exclusive-logical-OR data and the parity; and
 transmit the generated second data to a memory system that is replaced from the failed second memory system.

5. The information processing system according to claim 4, wherein
 the host is further configured to:
  in the case where the second memory system fails, transmit a first request to the first memory system; and
  in response to receiving a first response to the first request from the first memory system, transmit a second request to the third memory system,
 the controller of the first memory system is further configured to, in response to receiving the first request:
  generate the first exclusive-logical-OR data by performing the exclusive-logical-OR operation on the third data and the first data;
  transmit the first response to the host; and
  transmit the first exclusive-logical-OR data to the third memory system, and
 the controller of the third memory system is further configured to, in response to receiving the second request:
  generate the second data by performing the exclusive-logical-OR operation on the first exclusive-logical-OR data and the parity; and
  transmit the generated second data to the memory system that is replaced from the failed second memory system.

6. The information processing system according to claim 4, wherein
 the host is further configured to transmit a first request to the first memory system in the case where the second memory system fails,
 the controller of the first memory system is further configured to, in response to receiving the first request:
  generate the first exclusive-logical-OR data by performing the exclusive-logical-OR operation on the third data and the first data; and
  transmit a second request and the first exclusive-logical-OR data to the third memory system, and the controller of the third memory system is further configured to, in response to receiving the second request:
 generate the second data by performing the exclusive-logical-OR operation on the first exclusive-logical-OR data and the parity; and
 transmit the generated second data to the memory system that is replaced from the failed second memory system.

7. The information processing system according to claim 4, wherein
 the plurality of memory systems further includes a fourth memory system,
 the controller of the fourth memory system is configured to:
  store the third data in a fourth nonvolatile memory; and
  transmit the third data to the first memory system in the case where the second memory system fails,
 the controller of the first memory system is configured to generate the first exclusive-logical-OR data by performing the exclusive-logical-OR operation on the third data received from the fourth memory system and the first data, and
 the first data, the second data, the third data, and the parity constitute at least a part of the error correction code frame.

8. The information processing system according to claim 4, wherein
 the plurality of memory systems further includes a fourth memory system and a fifth memory system,
 the controller of the fourth memory system is configured to:
  store fourth data in a fourth nonvolatile memory; and
  in the case where the second memory system fails,
   receive fifth data from the fifth memory system,
   generate the third data by performing an exclusive-logical-OR operation on the fifth data and the fourth data, and
   transmit the third data to the first memory system,
 the controller of the first memory system is configured to generate the first exclusive-logical-OR data by performing the exclusive-logical-OR operation on the third data received from the fourth memory system and the first data, and
 the first data, the second data, the fourth data, and the parity constitute at least a part of the error correction code frame.

9. The information processing system according to claim 4, wherein
 the third data is data in which all bits are zero.

10. A storage system connectable to a host, comprising:
 a plurality of memory systems each including a controller and a nonvolatile memory, the plurality of memory systems including at least a first memory system, a second memory system, and a third memory system, wherein
 the controller of the first memory system is configured to store first data in a first nonvolatile memory,
 the controller of the second memory system is configured to store second data in a second nonvolatile memory,
 the first data and the second data constitute at least a part of an error correction code frame,
 the host is configured to, in a case where the first data and the second data are updated:
  transmit, to the first memory system, a first request and first update data updated from the first data; and transmit, to the second memory system, a second request and second update data updated from the second data, the host is further configured to:
  in response to receiving a first response to the first request from the first memory system, and receiving a second response to the second request from the second memory system, transmit a third request to the second memory system, the controller of the first memory system is further configured to, in response to receiving the first request:
  generate first exclusive-logical-OR data by performing an exclusive-logical-OR operation on at least the first data and the first update data;
  transmit the first response to the host; and
  transmit the first exclusive-logical-OR data to the second memory system, the controller of the second memory system is further configured to, in response to receiving the second request:
  generate third exclusive-logical-OR data by performing an exclusive-logical-OR operation on the second data and the second update data; and
  transmit the second response to the host, and the controller of the second memory system is further configured to, in response to receiving the third request:
  receive the first exclusive-logical-OR data from the first memory system;
  generate second exclusive-logical-OR data by performing an exclusive-logical-OR operation on the first exclusive-logical-OR data and the third exclusive-logical-OR data;
  transmit a third response to the third request to the host; and
  transmit the second exclusive-logical-OR data to the third memory system.

11. The storage system according to claim 10, wherein
the controller of the third memory system is configured to store a parity in a third nonvolatile memory, and
the first data, the second data, and the parity constitute at least a part of the error correction code frame.

12. The storage system according to claim 10, wherein
the controller of the third memory system is configured to store a parity in a third nonvolatile memory,
the first data, the second data, and the parity constitute at least a part of the error correction code frame,
the host is further configured to transmit a fourth request to the third memory system in response to receiving the third response,
the controller of the third memory system is further configured to, in response to receiving the fourth request, generate an update parity by performing an exclusive-logical-OR operation on the parity and the second exclusive logical OR data, and
the first update data, the second update data, and the update parity constitute at least a part of the error correction code frame that is updated.

* * * * *